United States Patent
Smirnov

(10) Patent No.: US 11,435,764 B1
(45) Date of Patent: Sep. 6, 2022

(54) MASS FLOW CONTROLLER UTILIZING NONLINEARITY COMPONENT FUNCTIONS

(71) Applicant: Hitachi Metals, Ltd., Tokyo (JP)

(72) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 17/216,766

(22) Filed: Mar. 30, 2021

(51) Int. Cl.
*G05D 7/06* (2006.01)
*G01F 1/698* (2006.01)

(52) U.S. Cl.
CPC ........... *G05D 7/0635* (2013.01); *G01F 1/698* (2013.01); *Y10T 137/7761* (2015.04)

(58) Field of Classification Search
CPC .. G05D 7/0635; Y10T 137/7761; G01F 1/698
USPC ...................................................... 137/487.5
See application file for complete search history.

(56) References Cited

U.S. PATENT DOCUMENTS

| | | | | |
|---|---|---|---|---|
| 4,556,956 A * | 12/1985 | Dickenson | ............... | F01D 17/24 |
| | | | | 700/42 |
| 5,129,418 A | 7/1992 | Shimomura et al. | | |
| 5,944,048 A * | 8/1999 | Bump | ....................... | G01F 1/86 |
| | | | | 137/487.5 |
| 5,950,668 A * | 9/1999 | Baumann | .................. | F15B 9/09 |
| | | | | 137/487.5 |
| 6,389,364 B1 | 3/2002 | Vyers | | |
| 7,565,255 B2 | 7/2009 | Kanke et al. | | |
| 8,036,780 B2 * | 10/2011 | Gotoh | .................. | G05D 7/0635 |
| | | | | 700/282 |
| 8,068,999 B2 | 11/2011 | Wang et al. | | |

(Continued)

FOREIGN PATENT DOCUMENTS

| | | |
|---|---|---|
| JP | H0756636 A | 3/1995 |
| JP | 200282722 A | 3/2002 |
| WO | 2019208447 A1 | 10/2019 |

OTHER PUBLICATIONS

Yamamura, Hidemasa, "International Search Report and Written Opinion Regarding International Application No. PCT/JP2019/016866", dated Jun. 20, 2019, pp. 10, Published in: JP.

(Continued)

*Primary Examiner* — William M McCalister
(74) *Attorney, Agent, or Firm* — Neugeboren O'Dowd PC

(57) ABSTRACT

Mass flow controllers and methods for controlling mass flow controllers are disclosed. A method includes providing a gas through a thermal mass flow sensor of the mass flow controller and processing a sensor signal from the thermal mass flow sensor to produce a flow signal. A total nonlinearity characteristic function is determined based on nonlinearity effects on the flow signal and includes a first and second nonlinearity component function based on a first and second source of nonlinearity respectively. The total nonlinearity characteristic function is calibrated, and the first nonlinearity component function is adjusted responsive to changes in the first source of nonlinearity, after which the total nonlinearity characteristic function is updated. The flow signal is corrected to produce a corrected flow signal using the total nonlinearity characteristic function. A valve of the mass flow controller is controlled using the corrected flow signal and a setpoint signal.

18 Claims, 15 Drawing Sheets

(56) References Cited

U.S. PATENT DOCUMENTS

| | | | |
|---|---|---|---|
| 8,131,400 B2* | 3/2012 | Smirnov | G05D 7/0635 700/282 |
| 8,196,601 B2* | 6/2012 | Smirnov | G01F 5/00 137/468 |
| 8,485,219 B2 | 7/2013 | Goto et al. | |
| 8,915,262 B2* | 12/2014 | Smirnov | G05D 7/0635 137/486 |
| 9,223,318 B2* | 12/2015 | Takeuchi | G05D 7/0652 |
| 9,823,667 B2* | 11/2017 | Takijiri | G05D 7/0635 |
| 10,048,105 B2* | 8/2018 | Valentine | G01F 1/88 |
| 10,473,500 B2* | 11/2019 | Smirnov | G01F 15/002 |
| 10,508,943 B2* | 12/2019 | Sasaki | G01F 1/696 |
| 2005/0000981 A1 | 1/2005 | Peng et al. | |
| 2010/0229965 A1 | 9/2010 | Kashima et al. | |
| 2011/0247696 A1* | 10/2011 | Zolock | G05D 7/0635 137/2 |
| 2012/0186655 A1* | 7/2012 | Smirnov | G05D 7/0635 137/1 |
| 2013/0146148 A1* | 6/2013 | Smirnov | F17D 1/16 137/13 |
| 2014/0246097 A1* | 9/2014 | Smirnov | G05D 7/0635 137/10 |
| 2014/0260513 A1* | 9/2014 | Smirnov | G01F 25/0007 73/1.34 |
| 2016/0001239 A1 | 1/2016 | Dille et al. | |
| 2017/0167912 A1* | 6/2017 | Okano | G01F 25/0007 |
| 2019/0331515 A1 | 10/2019 | Smirnov | |

OTHER PUBLICATIONS

Kageyama, Naohiro, "Interntaional Search Report and Written Opinion Re: Application No. PCT/JP2022/004916", dated May 10, 2022, p. 9, Published in: PCT.

* cited by examiner

MASS FLOW CONTROLLER UTILIZING NONLINEARITY COMPONENT FUNCTIONS

BACKGROUND

Field

The present invention relates to mass flow sensors and mass flow controllers, and in particular, but not by way of limitation, the present invention relates to improving an accuracy of mass flow sensors.

Background

A typical mass flow controller (MFC) is a device that sets, measures, and controls the flow of a gas in industrial processes such as thermal and dry etching among other processes. An important part of an MFC is a thermal mass flow sensor that measures the mass flow rate of the gas flowing through the device.

As opposed to an idealized flow signal that has a perfect linear dependence upon a mass flow rate of the gas, a flow signal that is output by a thermal mass flow sensor is nonlinear relative to an actual flow rate of the fluid: a total nonlinearity characteristic of the thermal mass flow sensor drops at higher flow rates as shown in FIG. 12. In other words, the relationship of the flow signal to the flow is not constant—it decreases with increasing flow. As used herein, total nonlinearity characteristic of the thermal mass flow sensor refers to the nonlinear relationship of the flow signal to the mass flow rate of the gas flowing through the MFC.

In a typical mass flow controller, the total nonlinearity of the thermal mass flow sensor is characterized during calibration under steady-state conditions, and then stored as nonlinearity data in a memory of the MFC in the form of a table. Then, a flow signal from the thermal mass flow sensor is adjusted using the nonlinearity data to provide a corrected flow signal. However, the way the adjustment is typically done includes errors and is otherwise deficient, which results in a corrected flow signal that does not match an actual flow rate of the gas that is passing through the MFC. In some instances, for example, an actual flow output from the MFC will take a long time to reach a setpoint while a corrected flow signal of the measured flow is already at the setpoint as shown in FIG. 13.

Other methods of adjusting for the total nonlinearity of the thermal mass flow sensor have been proposed, such as by dynamically adjusting for the total nonlinearity during flow rate transitions. However, MFCs may have multiple sources of nonlinearity that may individually affect the total nonlinearity in different ways depending on MFC operating conditions. For example, nonlinearity effects due to MFC bypass behavior, such as turbulence, may become a significant source of nonlinearity at higher flow rates and cause errors in current methods of nonlinearity adjustment. Specifically, high flow rates may produce bypass nonlinearity effects that cause current methods of nonlinearity adjustment to adjust a flow signal incorrectly and, in some cases, produce greater error than if no adjustment were made.

Accordingly, a need exists for a method and/or apparatus to provide new and innovative features that address the shortfalls of present methodologies in nonlinearity adjustment to a flow signal.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some aspects of the present disclosure may be characterized as a method for controlling a mass flow controller that includes providing a gas through a thermal mass flow sensor of the mass flow controller and processing a sensor signal from the thermal mass flow sensor of the mass flow controller to produce a flow signal. The method may also include determining a total nonlinearity characteristic function based on nonlinearity effects on the flow signal, wherein the total nonlinearity characteristic function includes, at least, a first nonlinearity component function, based on a first source of nonlinearity, and a second nonlinearity component function, based on a second source of nonlinearity. The method may also include calibrating the total nonlinearity characteristic function and adjusting the first nonlinearity component function responsive to changes in the first source of nonlinearity. The method may also include updating the total nonlinearity characteristic function after adjusting the first nonlinearity component function and correcting the flow signal to produce a corrected flow signal using the total nonlinearity characteristic function. The method may also include controlling a valve of the mass flow controller using the corrected flow signal and a setpoint signal.

Other aspects of the present disclosure may be characterized as a mass flow controller that includes a main flow path for a gas, a control valve to control a flow rate of the gas through the main flow path, a thermal mass flow sensor coupled to the main flow path to provide a sensor signal indicative of a mass flow rate of the gas. The mass flow controller may also include means for processing the sensor signal from the thermal mass flow sensor of the mass flow controller to produce a flow signal and means for determining a total nonlinearity characteristic function based on nonlinearity effects on the flow signal, wherein the total nonlinearity characteristic function includes, at least, a first nonlinearity component function, based on a first source of nonlinearity, and a second nonlinearity component function, based on a second source of nonlinearity. The mass flow controller may also include means for calibrating the total nonlinearity characteristic function and means for adjusting the first nonlinearity component function responsive to changes in the first source of nonlinearity. The mass flow controller may also include means for updating the total nonlinearity characteristic function after adjusting the first nonlinearity component function and means for correcting the flow signal to produce a corrected flow signal using the total nonlinearity characteristic function. A control component of the mass flow controller may be coupled to the means for correcting and the control valve to control a position of the control valve based upon the corrected flow signal and a setpoint signal.

Other aspects of the present disclosure may be characterized as a mass flow controller that includes a main flow path for a gas, a control valve to control a flow rate of the gas though the main flow path, and a thermal mass flow sensor coupled to the main flow path to provide a sensor signal indicative of a mass flow rate of the gas. The mass flow controller may also include a processing portion to receive and process the sensor signal from the thermal mass flow sensor to produce a flow signal. The mass flow controller may also include a nonlinear compensator including a non-transitory, tangible processor readable storage medium, encoded with processor executable instructions to produce a corrected flow signal. The instructions may include instructions to determine a total nonlinearity characteristic function based on nonlinearity effects on the flow signal, wherein the total nonlinearity characteristic function includes, at least, a first nonlinearity component function, based on a first source of nonlinearity, and a second nonlinearity component function, based on a second source of nonlinearity. The instructions may also include instructions to calibrate the total nonlinearity characteristic function and adjust the first nonlinearity component function responsive to changes in the first source of nonlinearity. The instructions may also include instructions to update the total nonlinearity characteristic function after adjusting the first nonlinearity component function and correct the flow signal to produce the corrected flow signal using the total nonlinearity characteristic function. A control component may be coupled to the nonlinear compensator and the control valve to control a position of the control valve based upon the corrected flow signal and a setpoint signal.

DETAILED DESCRIPTION

Figure 1A:
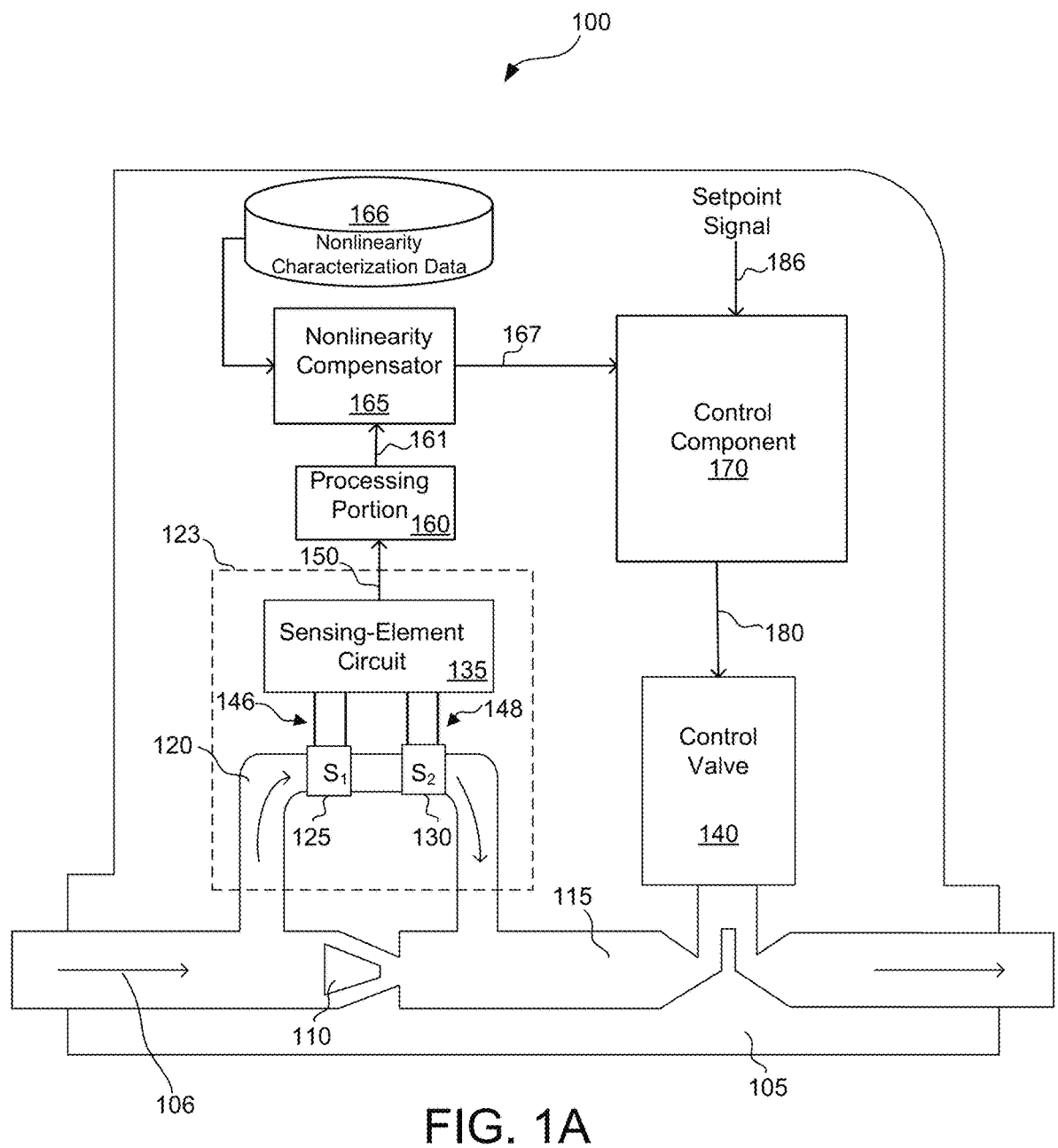
FIG. 1A is a block diagram of an exemplary mass flow controller (MFC) that incorporates improved methodologies for nonlinearity adjustment of a flow signal.

The present disclosure may enable a total nonlinearity characteristic function of a thermal mass flow sensor to be more accurately adjusted based on the effects of individual nonlinearity sources, which may each have different, independently varying nonlinearities. As a result, the present disclosure may enable a more accurate total nonlinearity characteristic function, which may be used to more accurately control gas flow through a MFC.

In some embodiments, a total nonlinearity characteristic function may be determined based on nonlinearity effects on a relationship between a flow rate of a gas through a MFC and a flow signal from a thermal mass flow sensor. The total nonlinearity characteristic function may comprise a plurality of nonlinearity component functions that are each representative of a contribution of a particular source of nonlinearity towards the total nonlinearity characteristic. Sources of nonlinearity may, for example, include at least one of nonlinearity due to thermal mass flow sensor behavior, or sensor nonlinearity, nonlinearity due to bypass behavior, or bypass nonlinearity, and nonlinearity due to dynamic pressure. The total nonlinearity characteristic function may be calibrated for a specific MFC under certain operating conditions. Deviations from calibration conditions may cause changes in the sources of nonlinearity. For example, deviations from a calibration temperature, pressure, or gas type or flow rate transitions may each potentially cause changes in at least one of the sources of nonlinearity. Each nonlinearity component function may be independently adjusted responsive to changes in a corresponding source of nonlinearity, such as to compensate for nonlinearity errors introduced by a deviation from calibration conditions. The total nonlinearity characteristic function may then be updated to reflect the adjustments made to each of the nonlinearity component functions. The flow signal of the thermal mass flow sensor may then be corrected using the total nonlinearity characteristic function to produce a corrected flow signal, which may be used, along with a setpoint signal, to control a valve of the MFC and, thereby, the flow rate of the gas through the MFC.

Each of the adjustments made to each of the nonlinearity component functions may be either a steady-state adjustment, wherein one of the nonlinearity component functions is adjusted at a specific time responsive to steady-state changes in a corresponding source of nonlinearity so that the nonlinearity component function becomes a steady-state nonlinearity component function, or a dynamic adjustment, wherein one of the nonlinearity component functions is adjusted dynamically, over time, responsive to time-dependent changes in a corresponding source of nonlinearity so that the nonlinearity component function becomes a time-dependent nonlinearity component function. Thus, each of the nonlinearity component functions may be either steady-state or dynamic, time-dependent nonlinearity component functions.

The nonlinearity component functions may be combined in a variety of ways to form the total nonlinearity characteristic function. For example, the total nonlinearity characteristic function may comprise nonlinearity component functions combined through at least one of the nesting of functions, multiplication, addition, or any of a number of methods for mathematical combination known in the art.

Each of the nonlinearity component functions may be determined and calibrated in a variety of ways. For example, each source of nonlinearity associated with a specific MFC part, such as a thermal mass flow sensor or bypass, may have a corresponding nonlinearity component function determined and calibrated by characterizing the nonlinearity effects of the specific MFC part separately before MFC assembly. In another example, one or more of the nonlinearity component functions may be determined from the total nonlinearity characteristic function using empirical or analytical methods.

In some embodiments, the total nonlinearity characteristic function may include nonlinearity component functions for only a subset of all the sources of nonlinearity while maintaining a sufficient level of accuracy. For example, one or more sources of nonlinearity that have a significant effect on the total nonlinearity characteristic may be selected from the plurality of sources of nonlinearity, and the corresponding nonlinearity component functions may be included in the determined total nonlinearity characteristic function. Selecting only the sources of nonlinearity that have a significant effect on the total nonlinearity characteristic may enable the use of a simplified total nonlinearity characteristic, which may potentially reduce computing resource load and increase processing speeds.

Referring now to the drawings, FIG. 1A illustrates an exemplary mass flow controller (MFC) 100 that incorporates improved methodologies for nonlinearity adjustment of a flow signal 161 of the MFC 100. The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1A may be implemented in hardware, or hardware in combination with firmware and/or software. Moreover, in light of this specification, the construction of each individual component will be well known within the skill of those of ordinary skill in the art.

Throughout this disclosure, examples and embodiments are described in terms of gases being controlled, but it should be recognized that the examples and embodiments are generally applicable to fluids that may be gases or liquids, and the fluids may include a mixture of elements and/or compounds. A liquid, for example, may be sulfuric acid and a gas may be nitrogen. Depending upon the application, the MFC 100 may deliver a fluid in a gaseous state (e.g., nitrogen) and/or a liquid state (e.g., hydrochloric acid) to, for example, a tool in a semiconductor facility. The MFC 100 in many embodiments is configured to deliver a fluid under high pressure, low temperature, or to different types of containers or vessels.

As depicted, a base 105 of the MFC 100 includes a main flow path 106 and a bypass 110 through which a gas flows. The bypass 110 directs a constant proportion of gas through a main path 115 and sensor tube 120. As a consequence, the flow rate of the gas through the sensor tube 120 is indicative of the flow rate of the gas flowing through the main path 115 of the MFC 100.

In this embodiment, the sensor tube 120 is a small-bore tube that is part of a thermal mass flow sensor 123 of the MFC 100. And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD) and thermocouples) may also be utilized. Moreover, other embodiments may certainly utilize different numbers of sensors and different architectures for processing the signals from the sensors without departing from the scope of the present invention.

As depicted, sensing elements 125 and 130 are electrically connected to a sensing-element circuit 135. In general, the sensing-element circuit 135 is configured (responsive to signals 146, 148 from the sensing elements 125, 130) to provide a sensor signal 150, which is indicative of the flow rate through the sensor tube 120, and hence, indicative of the flow rate through the main path 115 of the MFC 100.

The sensor signal 150 is defined by a temperature profile along the sensor tube 120 that affects a temperature difference between the sensing elements 125, 130. The sensor signal 150 is nonlinear relative to the flow rate through the sensor tube 120 across a range of flow rates: the total nonlinearity characteristic of the sensor signal 150 deviates from linearity more greatly at higher flow rates (as compared to lower flow rates).

As shown in FIG. 1A, the sensor signal 150 may be processed by a processing portion 160 to generate the flow signal 161 that is a processed representation of the sensor signal 150. For example, the flow signal 161 may be a digital representation of the sensor signal 150. More specifically, the processing portion 160 may amplify and convert, using an analog to digital converter, the sensor signal 150 to a digital representation of the sensor signal 150. The processing portion 160 may also include logic to provide a zero-offset adjustment to the sensor signal 150 as is known in the prior art.

Figure 12:
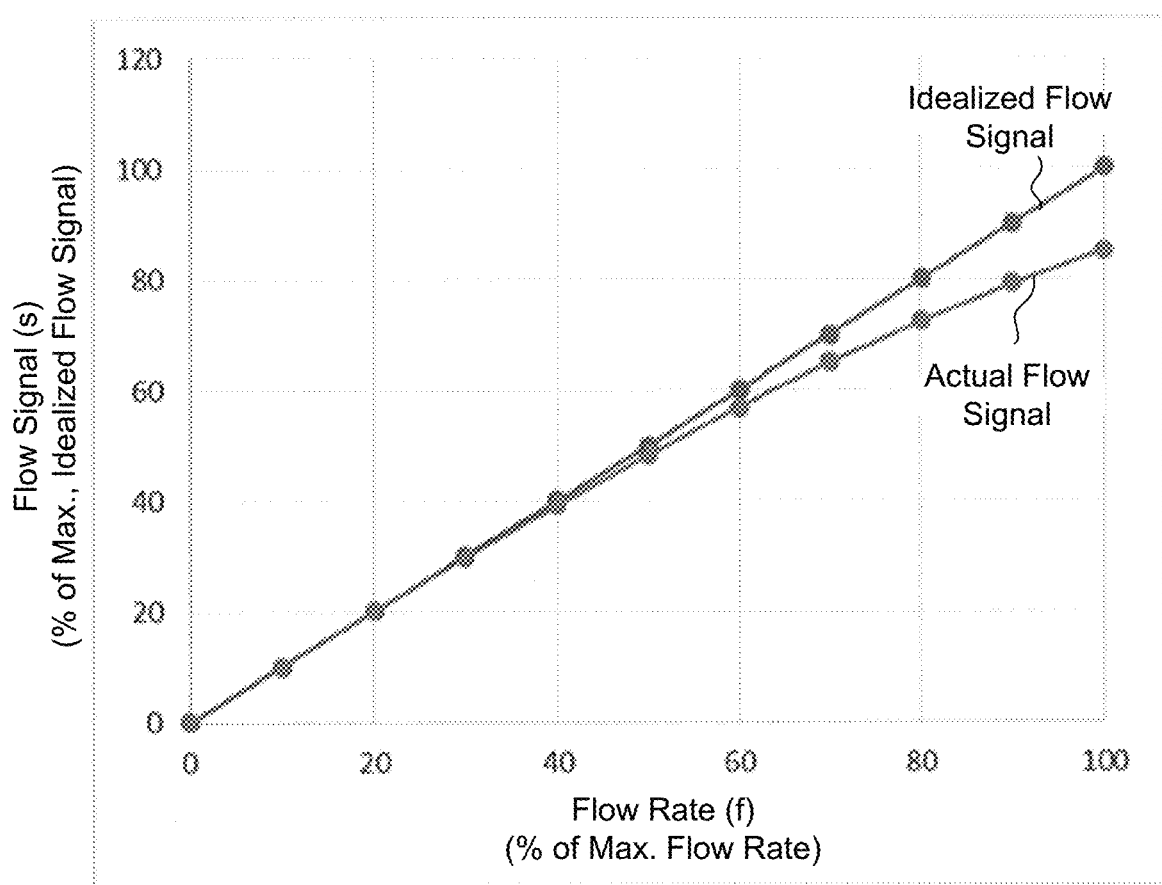
FIG. 12 depicts graphs of an idealized flow signal and an actual flow signal in relation to flow rate consistent with prior art mass flow controllers.
Figure 13:
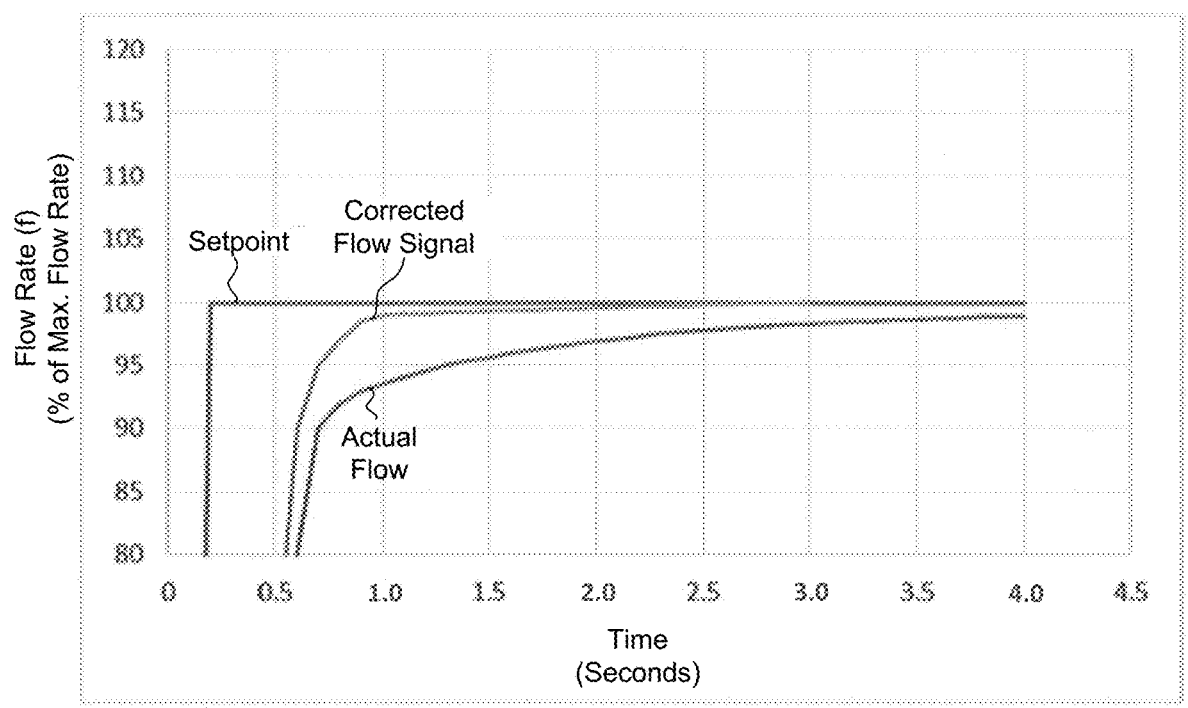
FIG. 13 depicts graphs of a setpoint, corrected flow signal, and an actual flow rate consistent with aspects of prior art mass flow controllers.

As shown, the MFC 100 also includes nonlinearity characterization data 166, which may include the steady-state-derived nonlinearity characterization data (stored as calibration coefficients) discussed above in the Background that are known in the prior art. For example, the calibration coefficients of the nonlinearity characterization data 166 may be generated during calibration based upon data that resembles the data graphed in FIG. 12 and used in a total nonlinearity characteristic function of the flow signal 161 so that after calibration, for example, the flow signal 161 may be corrected to compensate for the inaccurate output of the thermal mass flow sensor 123. As shown in FIG. 12, for example, the flow signal 161 may be more than 5% inaccurate at a 100% flow rate. Thus, the calibration coefficients may include coefficients to increase the flow signal 161 at the 100% flow rate to match the actual flow.

More specifically, the flow signal 161, s, is described as: s=F(f) (Equation 1) where f is the flow rate and F is the total nonlinearity characteristic function, and the nonlinearity characterization data 166, such as the calibration coefficients, may be generated to calibrate the s=F(f) relationship for specific operating conditions. A flow rate may be calculated by applying a function inversed to F(f) to the flow signal 161: $f=F^{-1}(s)$ (Equation 2), where s is the flow signal 161 and f is the flow rate, and this inverse function may be used in the correction of the flow signal 161 to match the actual flow rate. The inverse function, $F^{-1}(s)$, may be analytically calculated or stored in the form of a "look-up table" comprising flow rate and flow signal data.

However, the total nonlinearity characteristic of the flow signal 161 may depend on several sources of nonlinearity (sensor nonlinearity, bypass nonlinearity, dynamic pressure, etc.) that may potentially vary independently of each other responsive to deviations in MFC operating conditions from calibration conditions. These varying sources of nonlinearity may cause inaccuracies in the calibrated total nonlinearity characterization function, which may ultimately produce errors in the correction of the flow signal 161.

Such deficiencies may be addressed by utilizing a total nonlinearity characteristic function that comprises a plurality of nonlinearity component functions that are each representative of a contribution of a particular source of nonlinearity towards the total nonlinearity characteristic. In other words, a total nonlinearity characteristic function may be expressed as a combination of individual nonlinearity component functions. Such a total nonlinearity characteristic function may enable for adjustments to be made to individual nonlinearity component functions to compensate for variations in individual sources of nonlinearity that may occur when operating conditions deviate from calibration conditions, such as deviations from calibration temperature, pressure, or gas type or during flow rate transitions. The total nonlinearity characteristic function may then be updated to reflect the adjustments made to each of the nonlinearity component functions. The flow signal 161 of the thermal mass flow sensor 123 may then be corrected using the total nonlinearity characteristic function to produce a corrected flow signal 167.

In the embodiment depicted in FIG. 1A, the flow signal 161 is fed to a nonlinearity compensator 165, which may provide at least one of steady-state and dynamic nonlinearity correction using the total nonlinearity characteristic function and the nonlinearity characterization data 166. As shown, the correction provided by the nonlinearity compensator 165 results in the corrected flow signal 167 that is provided to a control component 170, and the control component 170 in this embodiment is part of a control system that includes sensing elements 125 and 130, sensing-element circuit 135, the processing portion 160, the nonlinearity compensator 165 and a setpoint signal 186.

Although FIG. 1A depicts the nonlinearity compensator 165 directly coupled to the control component 170, it should be recognized that additional processing components may be disposed between the nonlinearity compensator 165 and the control component 170. For example, the corrected flow signal 167 may be further modified in response to pressure and/or temperature measurements before being provided to the control component 170. As another example, the corrected flow signal 167 may be modified based upon the constituent components of the gas being controlled. Additional types of processing may also be carried out on the corrected flow signal 167 without departing from the scope of the present invention.

The control component 170 is generally configured to generate a control signal 180 to control a position of a control valve 140, which is coupled to the control component 170, to provide a flow rate based upon the corrected flow signal 167 and the setpoint signal 186. The control valve 140 may be realized by a piezoelectric valve or solenoid valve, and the control signal 180 may be a voltage (in the case of a piezoelectric valve) or a current (in the case of a solenoid valve).

Figure 1B:
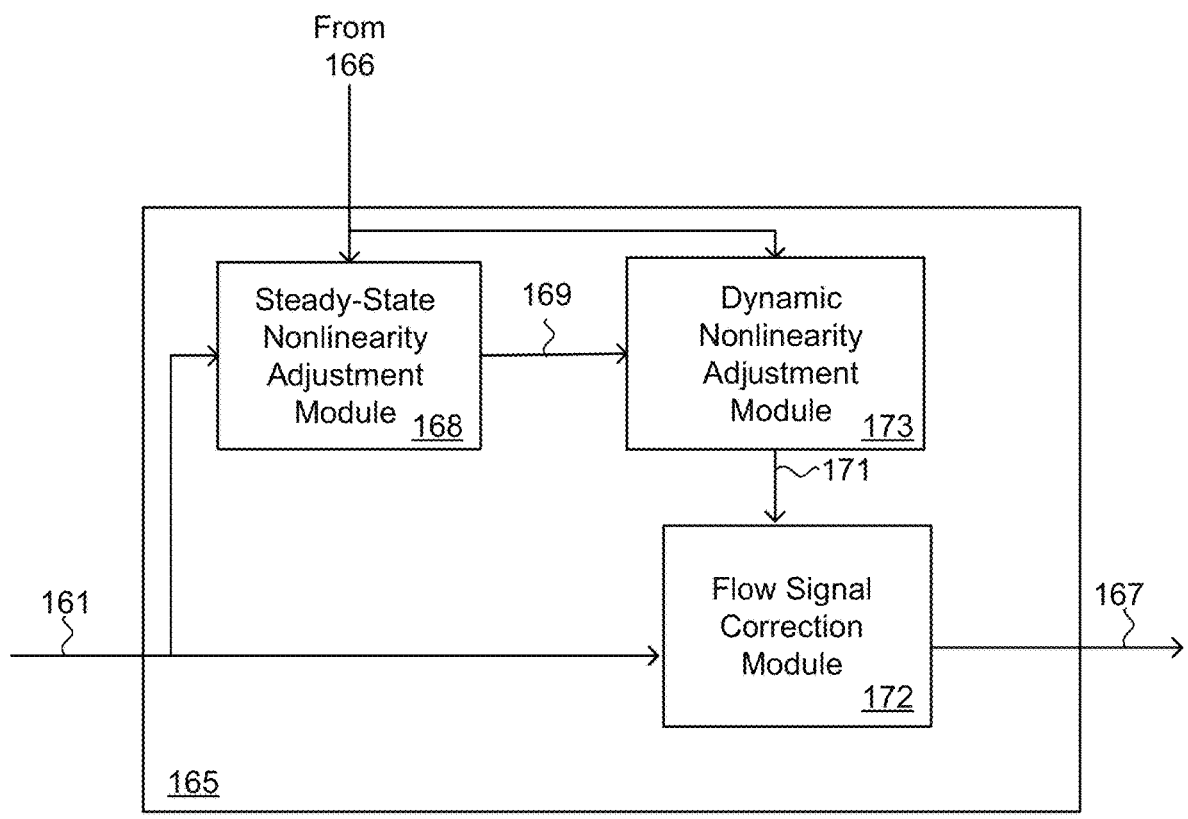
FIG. 1B is a block diagram depicting an exemplary embodiment of the nonlinearity compensator of FIG. 1A.
Figure 10:
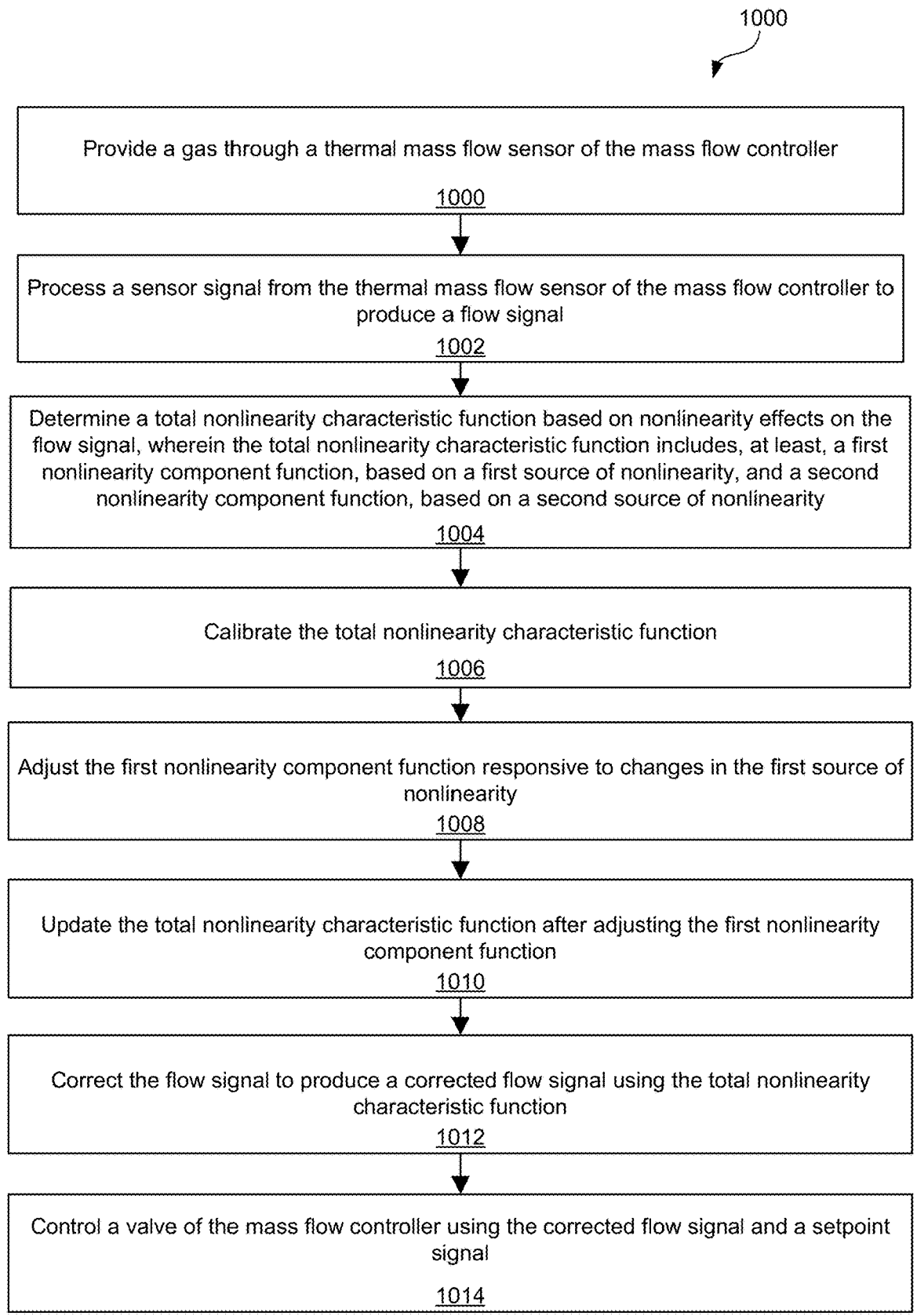
FIG. 10 is a flowchart depicting an exemplary method that may be traversed in connection with embodiments disclosed herein.

Referring next to FIG. 1B, shown is block diagram depicting an exemplary embodiment of the nonlinearity compensator 165. While referring to FIG. 1B, simultaneous reference is made to FIG. 10, which is a flowchart depicting a method that may be traversed in connection with embodiments disclosed herein. A gas may be provided through the thermal mass flow sensor 123 of the mass flow controller 100 (Block 1001). Flow of the gas through the thermal mass flow sensor 123 may produce the sensor signal 150 that is processed by the processing portion 160, such as through analog to digital conversion, to produce the flow signal 161 (Block 1002).

The nonlinearity compensator 165 may determine a total nonlinearity characteristic function based on nonlinearity effects on the flow signal 161, wherein the total nonlinearity characteristic function includes, at least, a first nonlinearity component function, based on a first source of nonlinearity, and a second nonlinearity component function, based on a second source of nonlinearity (Block 1004). For example, the nonlinearity compensator 165 may determine which sources of nonlinearity to account for, such as only sources of nonlinearity that contribute significantly to the total nonlinearity characteristic, and include corresponding nonlinearity component functions in the total nonlinearity characteristic function. In another example, the nonlinearity compensator 165 may determine how the nonlinearity component functions are combined to form the total nonlinearity characteristic function, such as through nesting, multiplication, addition, etc. In yet another example, the nonlinearity compensator 165 may determine the makeup of the individual nonlinearity component functions included in the total nonlinearity characteristic function.

The nonlinearity compensator 165 may be used to calibrate the total nonlinearity characteristic function under certain operating conditions (Block 1006). The nonlinearity compensator 165 may generate calibration parameters, such as calibration coefficients, and store the calibration parameters in the nonlinearity characterization data 166. For example, coefficients of the total nonlinearity characteristic function may be calibrated based upon steady-state nonlinearity data, such as the data graphed in FIG. 12, to generate calibration coefficients that may be stored in the nonlinearity characterization data 166. Specifically, a gas may flow through the MFC 100 at a known flow rate under certain operating conditions, and the nonlinearity compensator 165 may tune, or calibrate, the coefficients of the total nonlinearity characteristic function so that the corrected flow signal 167 matches the known flow rate. In another example, calibration of the total nonlinearity characteristic may include calibrating at least one of the nonlinearity component functions individually, such as to generate and store calibration coefficients individually for that nonlinearity component function. Specifically for a nonlinearity source associated with a MFC part, such as sensor nonlinearity or bypass nonlinearity, a corresponding nonlinearity component function may be calibrated based upon steady-state nonlinearity data of the specific MFC part, which may be determined using known steady-state flow rates through the MFC part when separated from the MFC 100, such as prior to assembly.

The calibrated total nonlinearity characteristic function may be used in correcting the flow signal 161 to the corrected flow signal 167, such as through the inverse function of Equation 2, during steady-state operating conditions that do not significantly deviate from calibration conditions. For example, such correction of the flow signal without adjusting or updating the calibrated total nonlinearity characteristic function, or the nonlinearity component functions, may take place in a flow signal correction module 172 of the nonlinearity compensator 165, wherein the flow signal correction module 172 stores the calibrated total nonlinearity characteristic function and uses the inverse of the calibrated total nonlinearity characteristic function to correct the flow signal 161 to the corrected flow signal 167. Significant deviations from calibration conditions may potentially cause different changes in each of the sources of nonlinearity, causing inaccuracies in each corresponding nonlinearity component function and, thereby, the calibrated total nonlinearity characteristic function. Each affected nonlinearity component function may be adjusted, for example, to compensate for such deviations and maintain an accurate total nonlinearity characteristic function.

The nonlinearity compensator 165 may adjust the first nonlinearity component function responsive to changes in the first source of nonlinearity (Block 1008). Particularly, in some embodiments, a steady-state nonlinearity adjustment module 168 of the nonlinearity compensator 165 may independently make steady-state adjustments to any of the nonlinearity component functions, such as to the calibration coefficients of a nonlinearity component function, responsive to changes in a corresponding source of nonlinearity in order to compensate for the nonlinearity changes. Such steady-state adjustments may be based, for example, on current operating conditions, the flow signal 161, and the nonlinearity characterization data 166, which may include steady-state-derived nonlinearity characterization data for operating conditions that differ from the calibration conditions. The steady-state nonlinearity adjustment module 168 may output a steady-state adjustment signal 169 that indicates the adjustments made to the nonlinearity component functions and includes the flow signal 161. If no adjustments are made, the steady-state adjustment signal 169 may still be sent and indicate that no adjustments were made.

In some embodiments, a dynamic nonlinearity adjustment module 173 of the nonlinearity compensator 165 may independently make adjustments dynamically, over time, to any of the nonlinearity component functions, such as to the calibration coefficients of a nonlinearity component function, responsive to time-dependent changes in a corresponding source of nonlinearity, such as changes caused by a flow rate transition, in order to compensate for the time-dependent nonlinearity changes. The dynamic adjustments made over time to a specific nonlinearity component function may effectively make the adjusted nonlinearity component function a time-dependent nonlinearity component function. For example, the first nonlinearity component function may receive dynamic adjustments independently of the second nonlinearity component function. Such dynamic adjustments may be based, for example, on current operating conditions, the flow signal 161, and the nonlinearity characterization data 166. The dynamic nonlinearity adjustment module 173 may receive the steady-state adjustment signal 169 and may combine the steady-state adjustments indicated in the steady-state adjustment signal 169, if there are any, with the dynamic adjustments made in the dynamic nonlinearity adjustment module 173. The dynamic nonlinearity adjustment module 173 may output a combined adjustment signal 171 that indicates the combined steady-state and dynamic adjustments made to the nonlinearity component functions. If no dynamic adjustments are made the combined adjustment signal 171 may be just the steady-state adjustment signal 169. If no steady-state or dynamic adjustments are made the combined adjustment signal 171 may still be sent and indicate that no adjustments were made.

In some embodiments, the nonlinearity compensator 165 may adjust the second nonlinearity component function, independently of the first nonlinearity component function, responsive to changes in the second source of nonlinearity. The first nonlinearity component function and the second nonlinearity function may each be adjusted independently of each other, in some cases simultaneously, and the adjustment made to each nonlinearity component function may be either a steady-state adjustment or a dynamic adjustment. For example, the first nonlinearity component function may be a sensor nonlinearity component function that is adjusted, dynamically over time, responsive to a flow rate transition of the gas flowing through the MFC 100 so that the first nonlinearity component function is a time-dependent sensor nonlinearity component function, and the second nonlinearity component function may be a bypass nonlinearity component function that receives different adjustments, either steady-state or dynamic. In some cases, both a steady-state adjustment and a dynamic adjustment may be made to the same nonlinearity component function by the steady-state nonlinearity adjustment module 168 and the dynamic nonlinearity adjustment module 173.

The adjustments made by the nonlinearity compensator 165 may be made, for example, during operation of the MFC 100 without need of recalibration when operating conditions deviate from calibration conditions. Recalibration of the total nonlinearity characteristic function may potentially prompt a halt in normal operation of the MFC 100 to recalibrate the total nonlinearity characteristic function with known flow rates under new operating conditions. Adjusting nonlinearity component functions during operation of the MFC 100 using the nonlinearity compensator 165 enables the MFC 100 to continually operate during changing operating conditions without interruption for recalibration.

The nonlinearity compensator 165 may update the total nonlinearity characteristic function after adjusting the first nonlinearity component function (Block 1010). Specifically, in some embodiments, the flow signal correction module 172 may receive the combined adjustment signal 171 and update the total nonlinearity characteristic function using the adjustments made to the nonlinearity component functions in the steady-state nonlinearity adjustment module 168 and the dynamic nonlinearity adjustment module 173 as indicated by the combined adjustment signal 171. In some cases, the nonlinearity compensator 165 may also update the total nonlinearity characteristic function after adjusting the second nonlinearity component function. For example, the total nonlinearity characteristic function may be updated after adjustments are made to both the first and second nonlinearity component functions.

The nonlinearity compensator 165 may correct the flow signal 161 to produce a corrected flow signal 167 using the total nonlinearity characteristic function (Block 1012). Specifically, the flow signal correction module 172 of the nonlinearity compensator 165 may use the updated total nonlinearity characteristic function to correct the flow signal 161, such as with Equation 2. For example, the flow signal correction module 172 may determine a flow rate corresponding to the flow signal 161 using an inverse function of the updated total nonlinearity characteristic function, which may be either found analytically or generated as a lookup table using the updated total nonlinearity characteristic function. The determined flow rate corresponding to the flow signal 161 may be the corrected flow signal 167. The control component 170 may use the corrected flow signal 167 and the setpoint signal 186 in controlling the control valve 140 of the MFC 100 (Block 1014). Specifically, the control component 170 may compare the corrected flow signal 167 to the setpoint signal 186 to determine how to control the control valve 140.

In some embodiments, the adjusting of Block 1008, the updating of Block 1010, the correcting of Block 1012, and the controlling of Block 1014 may all be executed continuously during operation of the MFC 100, such as to maintain accuracy of the total nonlinearity characteristic function and the corrected flow signal 167 under a variety of different operating conditions. The continual maintenance of total nonlinearity characteristic function and corrected flow signal 167 accuracy may enable more accurate control of the flow rate of the gas through the MFC 100.

In some embodiments, the first nonlinearity component function may be a sensor nonlinearity component function, and the second nonlinearity component function may be a bypass nonlinearity component function. Sensor nonlinearity and bypass nonlinearity may be affected differently by varying steady-state operating conditions, such as temperature, pressure, and gas type, and the corresponding sensor and bypass nonlinearity component functions may be adjusted accordingly. The effect of different steady-state operating conditions on exemplary sensor and bypass nonlinearity component functions is illustrated in FIGS. 2-5 in accordance with the method 1000 of FIG. 10.

Figure 2:
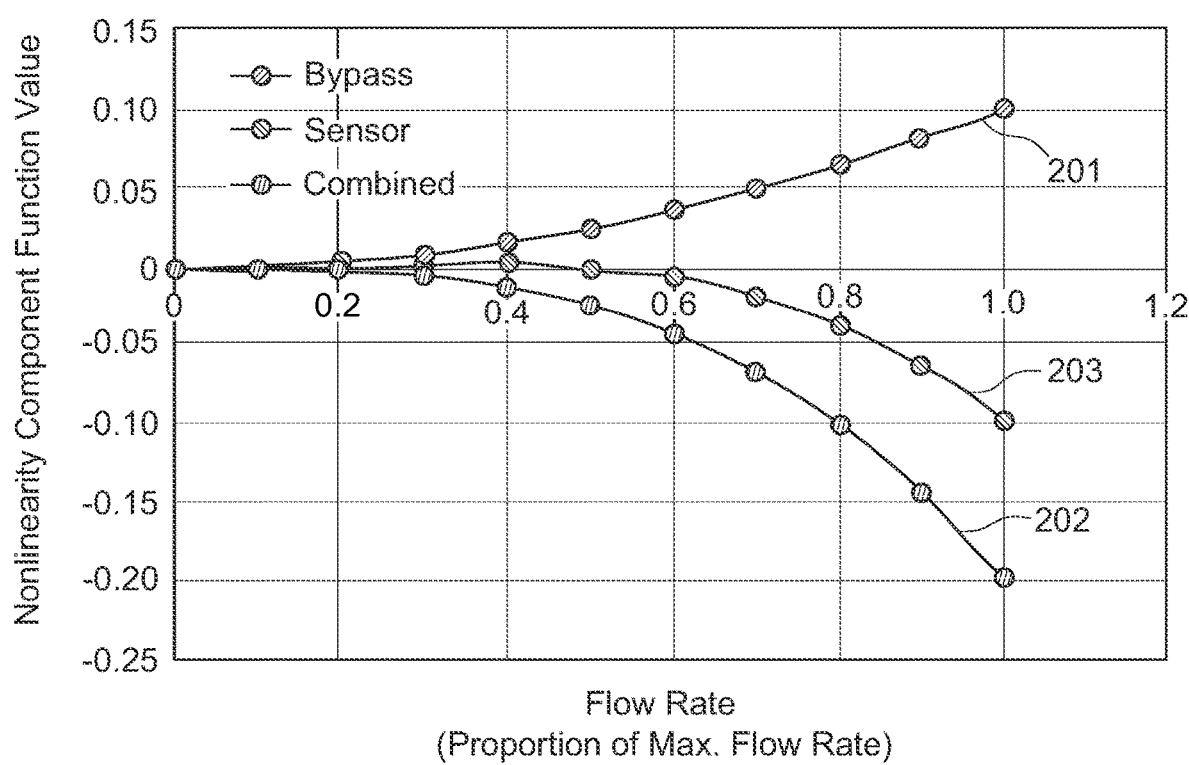
FIG. 2 depicts graphs of exemplary sensor and bypass nonlinearity component functions of an exemplary total nonlinearity characteristic function.
Figure 4:
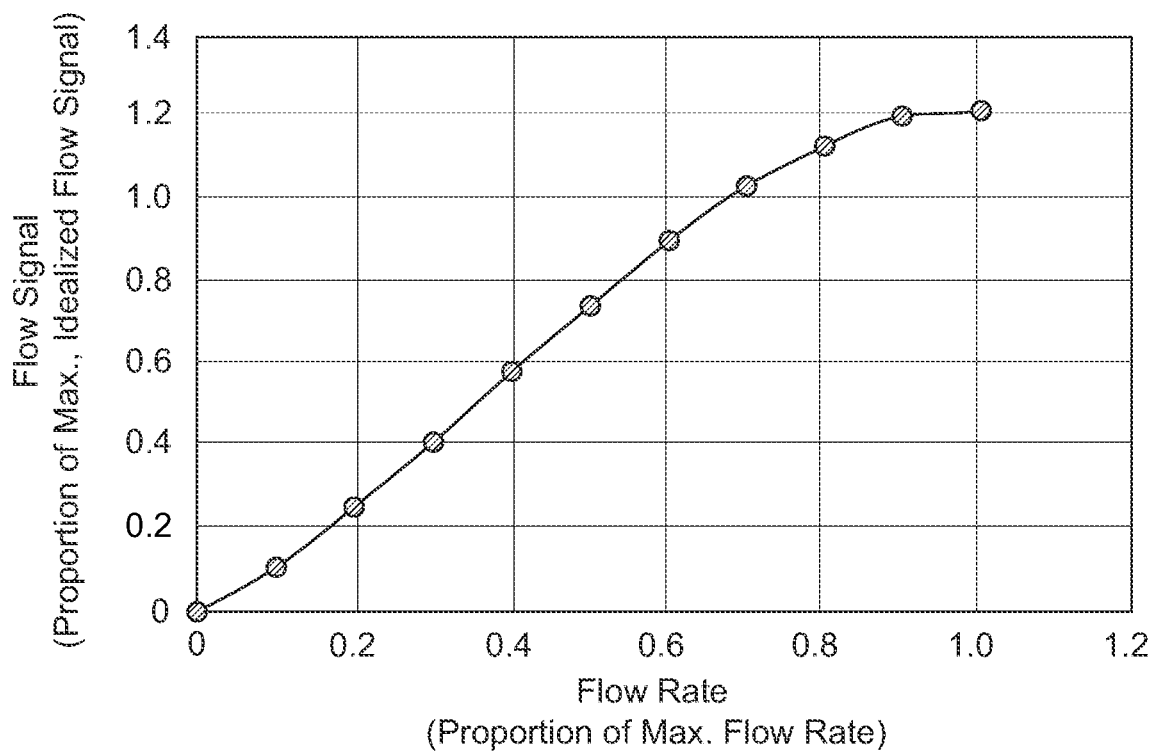
FIG. 4 is a graph depicting an exemplary calibrated total nonlinearity characteristic function.

FIG. 2 illustrates graphs of exemplary sensor and bypass nonlinearity component functions, 202 and 201, of an exemplary total nonlinearity characteristic function, 203. The bypass nonlinearity component function 201 and the sensor nonlinearity component function 202 shown have been determined and calibrated for specific operating conditions. The bypass nonlinearity component function 201 and the sensor nonlinearity component function 202 may be combined to form an intermediary combined nonlinearity component function 203, which may be used in determining and calibrating the total nonlinearity characteristic function to form the calibrated total nonlinearity characteristic function, as shown in FIG. 4.

Figure 3A:
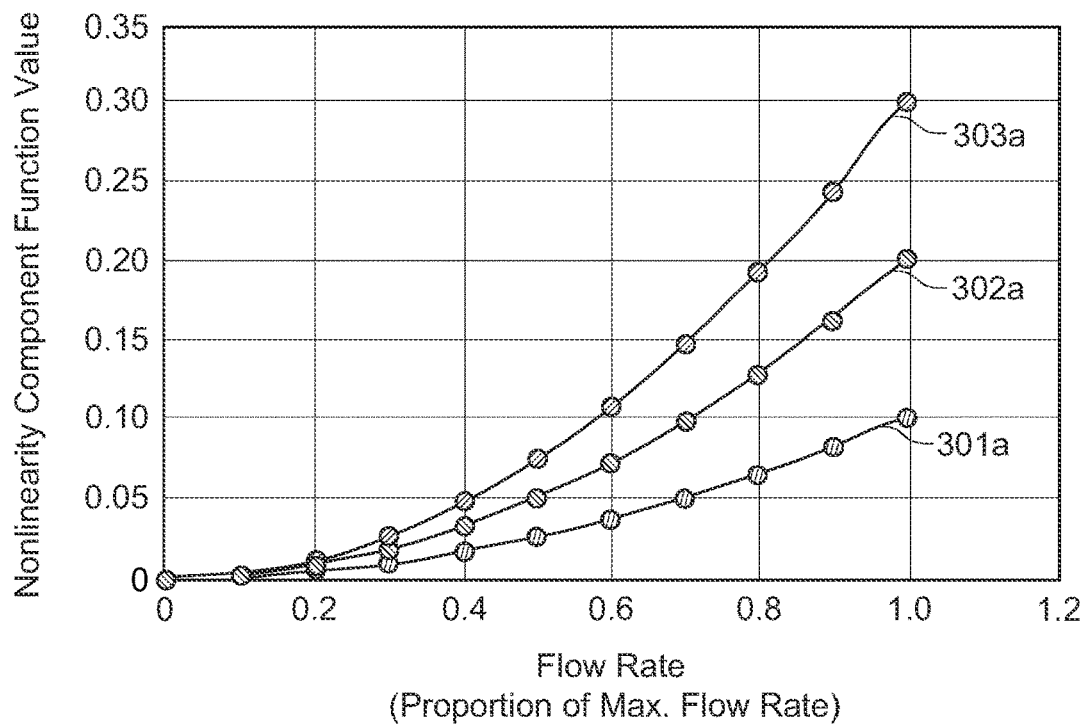
FIG. 3A depicts graphs of exemplary bypass nonlinearity component functions of an exemplary total nonlinearity characteristic function.
Figure 3B:
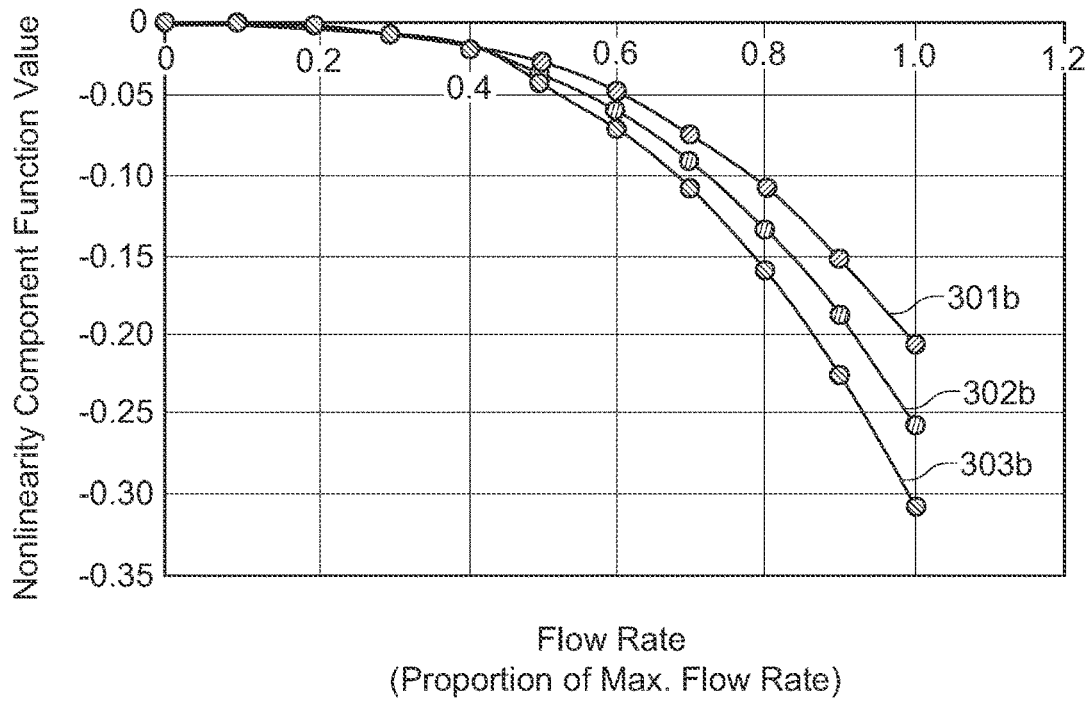
FIG. 3B depicts graphs of exemplary sensor nonlinearity component functions of an exemplary total nonlinearity characteristic function.

FIG. 3A and FIG. 3B illustrate graphs of exemplary bypass and sensor nonlinearity component functions, respectively, of an exemplary total nonlinearity characteristic function. Sensor nonlinearity, for example, may not be as affected as bypass nonlinearity by temperature and pressure deviations from calibration temperature and pressure. Additionally, sensor nonlinearity may have a greater dependence on a thermal conductivity of a gas, while bypass nonlinearity may have a greater dependence on a molecular mass of the gas. As a result, the adjustments made to the corresponding sensor and bypass nonlinearity component functions due to deviations from calibration conditions may, for example, be of different magnitudes and signs.

A calibrated bypass nonlinearity component function 301a and a calibrated sensor nonlinearity component function 301b may be adjusted responsive to steady-state changes in the bypass and sensor nonlinearity respectively.

For example, the calibrated bypass nonlinearity component function 301a and the calibrated sensor nonlinearity component function 301b may be adjusted responsive to a first set of non-calibration operating conditions, which deviate moderately from calibration conditions, to become a first adjusted bypass nonlinearity component function 302a and a first adjusted sensor nonlinearity component function 302b respectively. As shown, the calibrated bypass nonlinearity component function 301a and the calibrated sensor nonlinearity component function 301b may be independently and differentially adjusted, with different magnitudes and signs, to become the first adjusted bypass nonlinearity component function 302a and the first adjusted sensor nonlinearity component function 302b.

In another example, the calibrated bypass nonlinearity component function 301a and the calibrated sensor nonlinearity component function 301b may be adjusted responsive to a second set of non-calibration operating conditions, which deviate severely from calibration conditions, to become a second adjusted bypass nonlinearity component function 303a and a second adjusted sensor nonlinearity component function 303b respectively.

Figure 5:
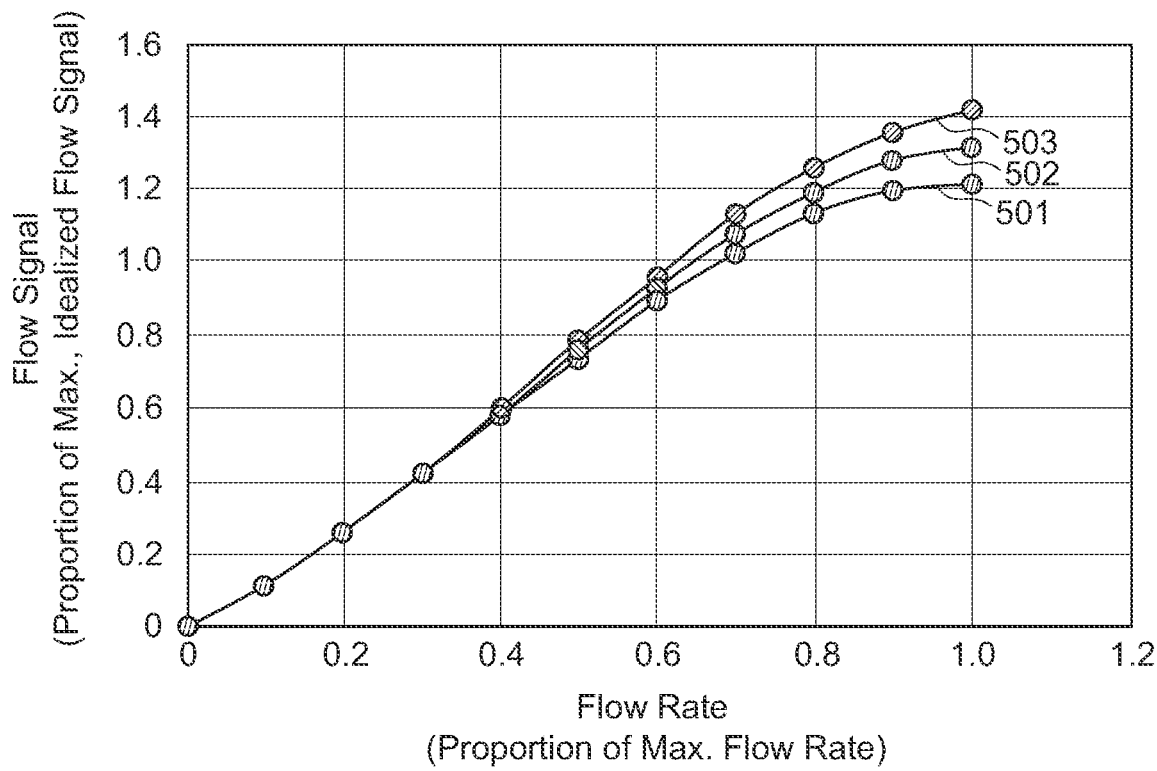
FIG. 5 depicts graphs of exemplary varying total nonlinearity characteristic functions.

FIG. 5 illustrates graphs of exemplary varying total nonlinearity characteristic functions, which may comprise the bypass and sensor nonlinearity component functions of FIG. 3A and FIG. 3B. A calibrated total nonlinearity characteristic function 501 may be the result of a combination of the calibrated bypass nonlinearity component function 301a and the calibrated sensor nonlinearity component function 301b; a first adjusted total nonlinearity characteristic function 502 may be the result of a combination of the first adjusted bypass nonlinearity component function 302a and the first adjusted sensor nonlinearity component function 302b; and a second adjusted total nonlinearity characteristic function 503 may be the result of a combination of the second adjusted bypass nonlinearity component function 303a and the second adjusted sensor nonlinearity component function 303b. The calibrated total nonlinearity characteristic function 501 may be updated after the steady-state adjustments are made to both the calibrated bypass nonlinearity component function 301a and the calibrated sensor nonlinearity component function 301b. Such updating of the calibrated total nonlinearity characteristic function 501 may produce either the first or second adjusted total nonlinearity characteristic function 502, 503, which may each be used during the corresponding operating conditions to more accurately relate the flow signal 161 to the gas flow rate through the MFC 100, enabling more accurate control of the gas flow rate.

In some embodiments, a total nonlinearity characteristic function may be determined, such as in Block 1004 of method 1000, to comprise a plurality of nonlinearity component functions that are combined through function nesting. For example, the total nonlinearity characteristic function may be described as: $F(f)=C_N(\ldots C_2(C_1(f))\ldots)$ (Equation 3) where f is the flow rate, $C_1 \ldots C_N$ are nonlinearity component functions, N is the number of nonlinearity component functions, and F is the total nonlinearity characteristic function. For example, the total nonlinearity characteristic function may be determined to comprise a bypass nonlinearity component function nested inside a sensor nonlinearity component function, as illustrated in the graphs of FIGS. 6A-C.

Figure 6A:
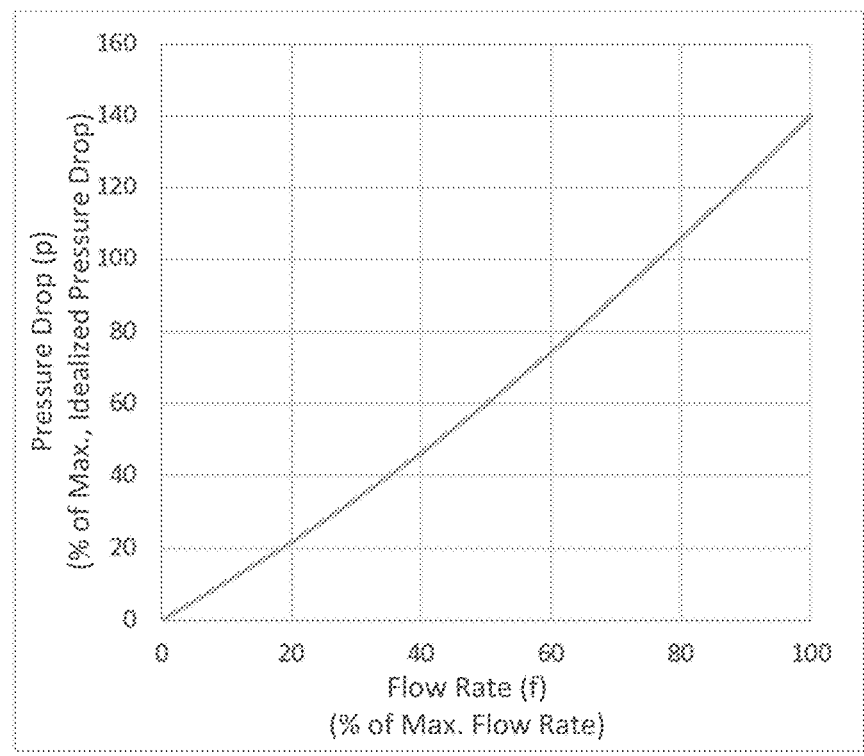
FIG. 6A is a graph depicting an exemplary relationship between pressure drop across an exemplary bypass and flow through the bypass.

FIG. 6A illustrates a graph depicting an exemplary relationship between pressure drop across an exemplary bypass and flow of a gas through the bypass. The pressure drop may be nonlinear relative to the flow, such as due to non-laminar gas flow, and may be described as: $p=C_B(f)$ (Equation 4) where f is the flow rate, $C_B$ is a bypass nonlinearity component function, and p is the pressure drop.

Figure 6B:
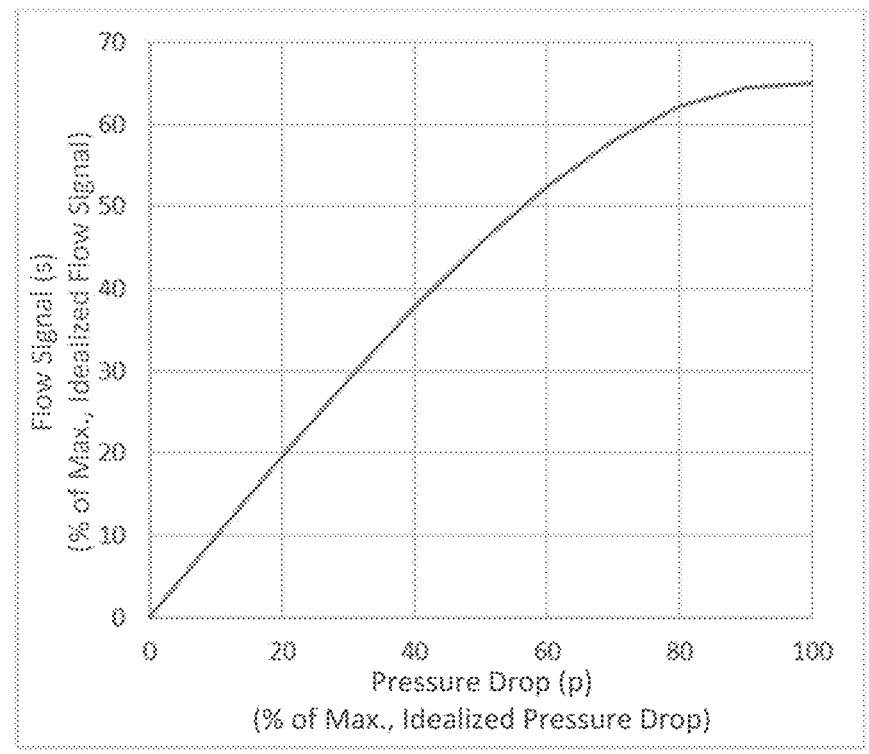
FIG. 6B is a graph depicting an exemplary relationship between pressure drop across an exemplary thermal mass flow sensor and a flow signal from the thermal mass flow sensor.

FIG. 6B illustrates a graph depicting an exemplary relationship between pressure drop across an exemplary thermal mass flow sensor and a flow signal from the thermal mass flow sensor. The pressure drop across the thermal mass flow sensor may be the same as the pressure drop across the bypass due to the configuration of the thermal mass flow sensor and bypass within a MFC, such as in the MFC 100 of FIG. 1A. The flow signal may be nonlinear relative to the pressure drop, such as due to heat transfer effects inside the thermal mass flow sensor, and may be described as: $s=C_S(p)$ (Equation 5) where s is the flow signal, $C_S$ is a sensor nonlinearity component function, and p is the pressure drop.

Figure 6C:
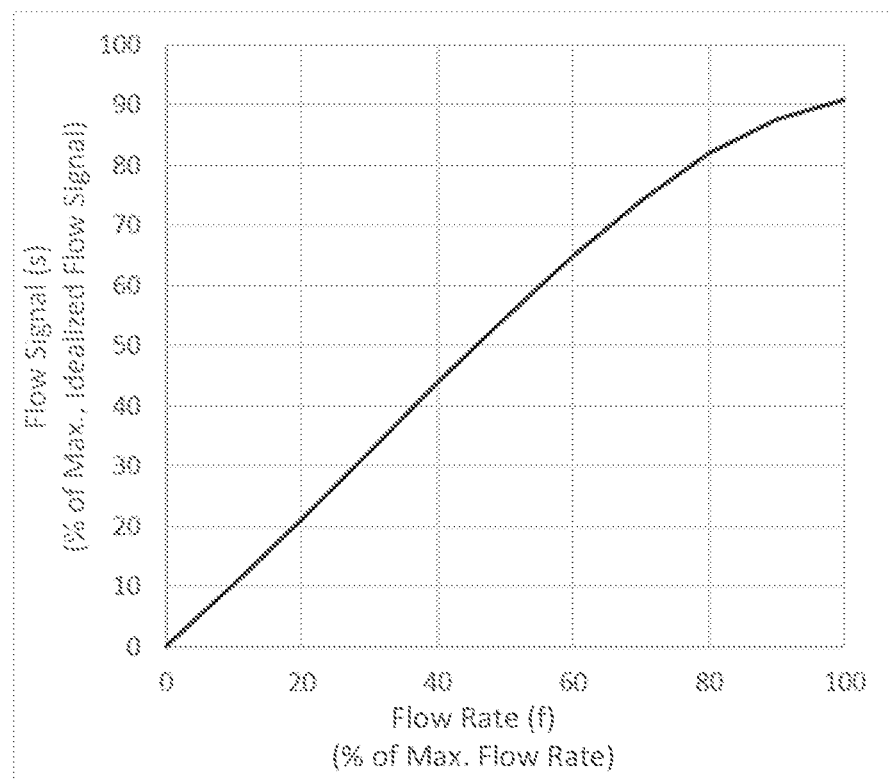
FIG. 6C is a graph depicting an exemplary total nonlinearity characteristic function that comprises nested nonlinearity component functions.

FIG. 6C illustrates a graph depicting an exemplary total nonlinearity characteristic function that comprises nested nonlinearity component functions, such as the bypass nonlinearity component function of FIG. 6A and the sensor nonlinearity component function of FIG. 6B. For example, the bypass and sensor nonlinearity component functions of FIG. 6A and FIG. 6B may be combined through function nesting. More specifically, Equation 4 may be used to substitute the bypass nonlinearity component function for the pressure drop term in Equation 5. As a result, the total nonlinearity characteristic function may be described as: $s=F(f)=C_S(C_B(f))$ (Equation 6) where s is the flow signal, f is the flow rate, $C_B$ is a bypass nonlinearity component function, $C_S$ is a sensor nonlinearity component function, and F is the total nonlinearity characteristic function. Such a total nonlinearity characteristic function may be determined in Block 1004 of method 1000 and used in the nonlinearity compensator 165 of FIG. 1B during the execution of method 1000.

In some embodiments, a total nonlinearity characteristic function may be determined, such as in Block 1004 of method 1000, to comprise a plurality of nonlinearity component functions that are combined through multiplication. For example, the total nonlinearity characteristic function may be described as: $F(f)=F_0(f)*C_1(f)*C_2(f)* \ldots *C_N(f)$ (Equation 7) where f is the flow rate, F is the total nonlinearity characteristic function, $C_1 \ldots C_N$ are nonlinearity component functions, $F_0$ is a fundamental component function, and N is the number of nonlinearity component functions.

The fundamental component function may be a function that relates the nonlinearity component functions to the total nonlinearity characteristic function but does not depend on the nonlinearity sources corresponding to the nonlinearity component functions included in the total nonlinearity characteristic function. For example, if the nonlinearity component functions for all sources of nonlinearity are included in the total nonlinearity characteristic, the fundamental component function may be a linear function described as: $F_0(f)=K*f$ (Equation 8) where f is the flow rate, $F_0$ is a fundamental component function, and K is a constant. However, if the nonlinearity component functions for all sources of nonlinearity are not included in the total nonlinearity characteristic, the fundamental component function may be a nonlinear function.

Figure 7A:
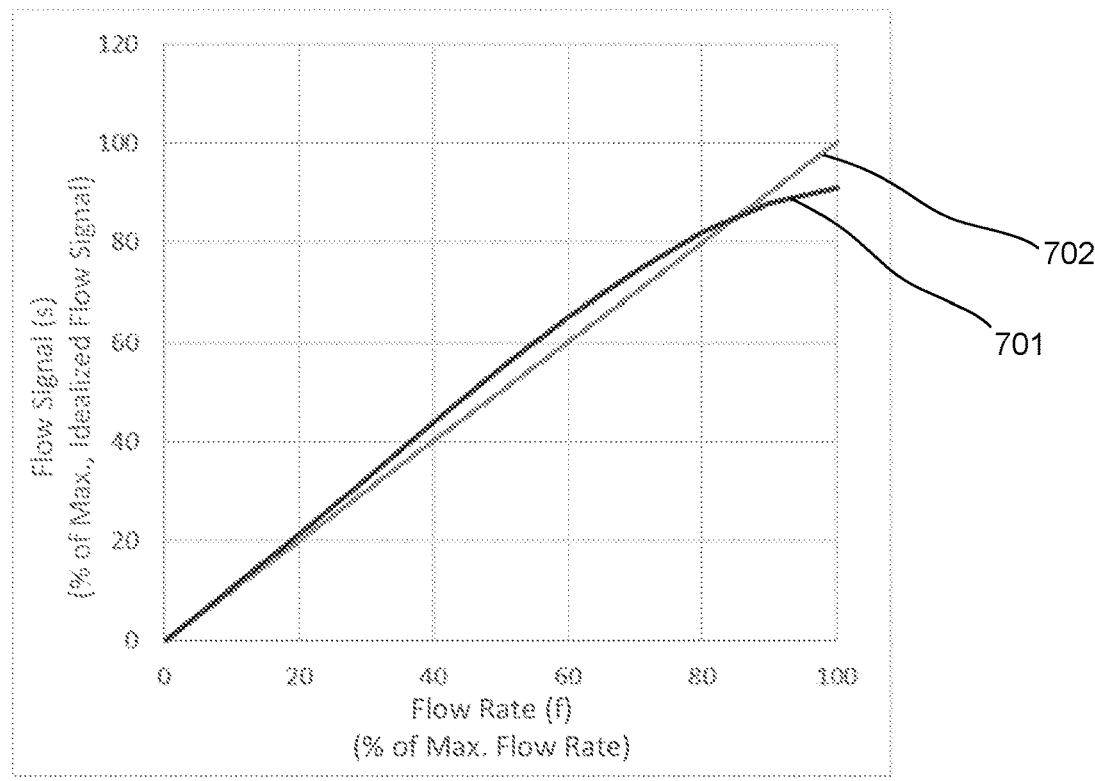
FIG. 7A depicts graphs of an exemplary total nonlinearity characteristic function and an exemplary linear fundamental component function.
Figure 7B:
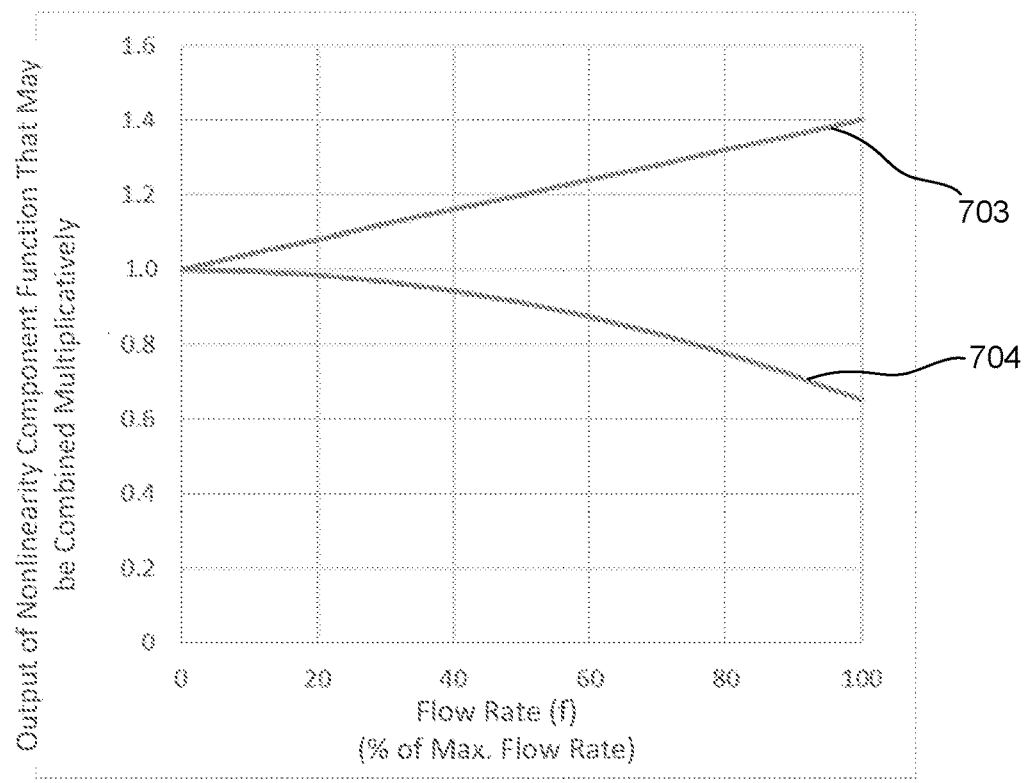
FIG. 7B depicts graphs of exemplary nonlinearity component functions that may be combined multiplicatively.
Figure 7C:
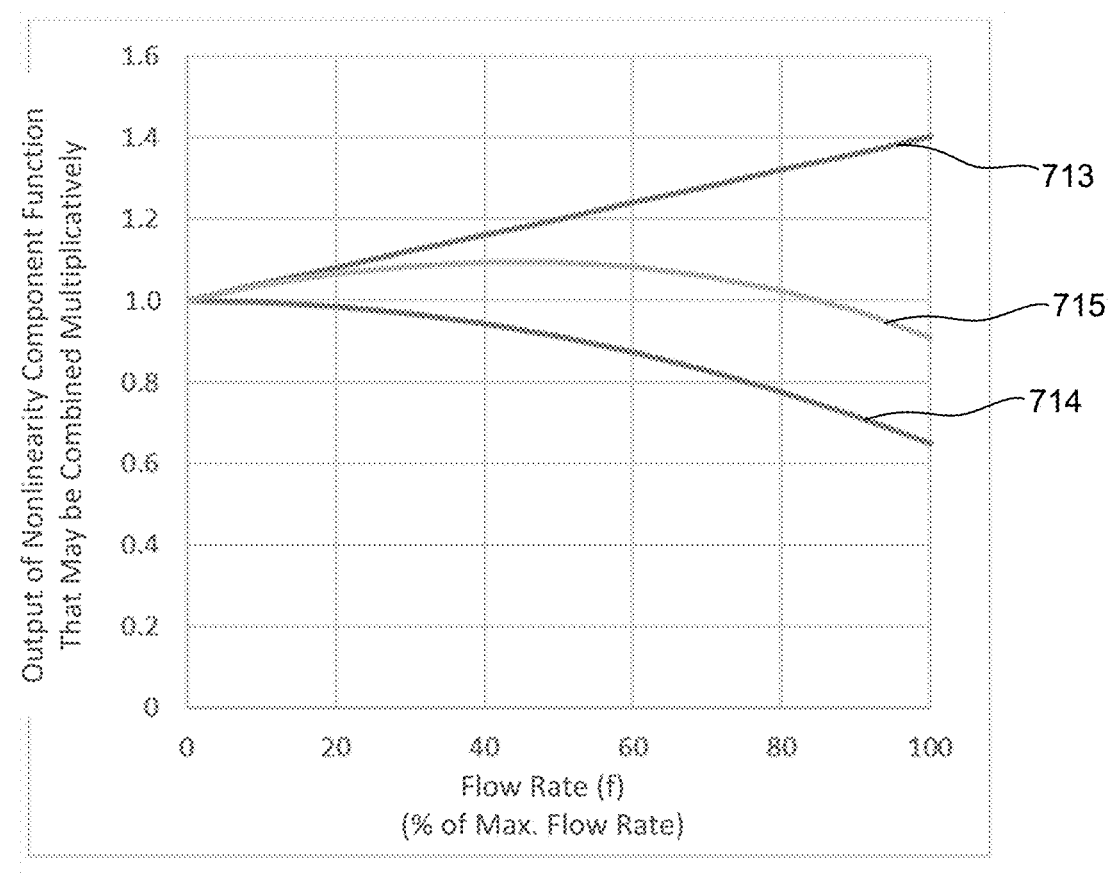
FIG. 7C depicts graphs of exemplary bypass and sensor nonlinearity component functions that may be combined multiplicatively.

The total nonlinearity characteristic function may, for example, be determined to comprise a first nonlinearity component function multiplied by a second nonlinearity component function, as illustrated in the graphs of FIGS. 7A-C. Specifically, the total nonlinearity characteristic function may be determined to be described as: $F(f)=K*f*C_1(f)*C_2(f)$ (Equation 9), where K is a constant, f is a current flow rate of the gas, $C_1(f)$ is the first nonlinearity component function, and $C_2(f)$ is the second nonlinearity component function. Such a total nonlinearity characteristic function may be determined in Block 1004 of method 1000 and used in the nonlinearity compensator 165 of FIG. 1B during the execution of method 1000.

FIG. 7A illustrates graphs of an exemplary total nonlinearity characteristic function 701 and an exemplary linear fundamental component function 702, and FIG. 7B illustrates graphs of exemplary nonlinearity component functions that may be combined multiplicatively, such as to form the total nonlinearity characteristic function 701 of FIG. 7A. For example, the total nonlinearity characteristic function 701 may be determined to be described as a product of the linear fundamental component function 702, a first nonlinearity component function 703, and a second nonlinearity component function 704, such as in Equation 9.

FIG. 7C illustrates graphs of exemplary bypass and sensor nonlinearity component functions 713, 714 that may be combined multiplicatively. For example, in some embodiments, the first nonlinearity component function may be the bypass nonlinearity component function 713, and the second nonlinearity component function may be the sensor nonlinearity component function 714. The bypass and sensor nonlinearity component functions 713, 714 may be combined through multiplication with a linear fundamental component function to form a total nonlinearity characteristic function. Additionally, the bypass and sensor nonlinearity component functions 713, 714 may be combined through multiplication to form a combined nonlinearity component function 715, which may, in some cases, be used in a total nonlinearity characteristic function.

Based on expected nonlinearity behavior, bypass nonlinearity may be approximated using a second order component of a polynomial, and sensor nonlinearity may be approximated using a third order component of a polynomial. As a result, the bypass nonlinearity component function 713 may be analytically determined and described as: $C_B(f)=1+a*f$ (Equation 10) where a is a constant and f is a flow rate of the gas, and the sensor nonlinearity component function 714 may be analytically determined and described as: $C_S(f)=1+b*f*f$ (Equation 11) where b is a constant and f is a flow rate of the gas. Thus, the total nonlinearity characteristic function formed by combining the bypass and sensor nonlinearity component functions 713, 714 may be analytically determined and defined as: $F(f)=K*f*(1+a*f)*(1+b*f*f)$ (Equation 12), where K, a, and b are constants, f is a flow rate of the gas, and F is the total nonlinearity characteristic function. K, a, and b may be calibrated, for example, during the calibration of Block 1006 of method 1000. Equation 12 may be determined in Block 1004 of method 1000 and used in the nonlinearity compensator 165 of FIG. 1B during the execution of method 1000.

Figure 8A:
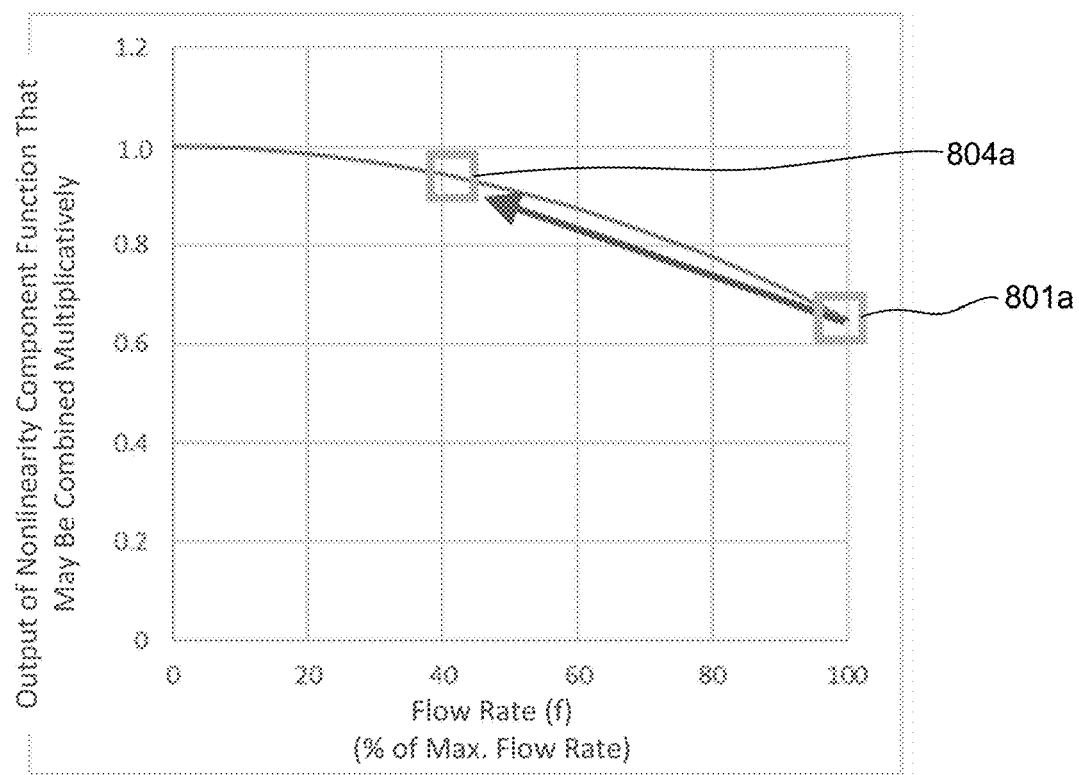
FIG. 8A is a graph depicting an exemplary sensor nonlinearity component function of an exemplary total nonlinearity correction function that may be used in steady-state conditions.
Figure 8B:
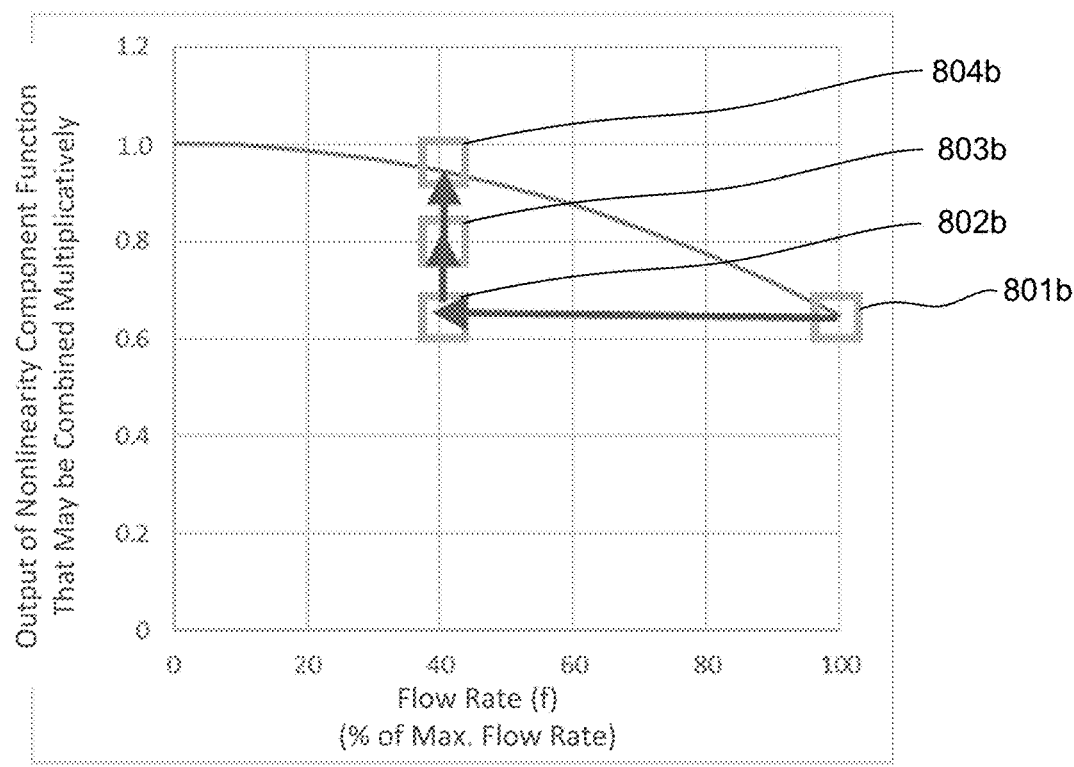
FIG. 8B is a graph depicting an exemplary sensor nonlinearity component function of an exemplary total nonlinearity correction function that is dynamically adjusted.

In general, sources of nonlinearity may each have different time-dependent, dynamic nonlinearity characteristics, such as during a flow rate transition. Flow rate transitions may occur responsive to a change in a setpoint of a MFC. For example, referring back to the thermal mass flow sensor 123 of FIG. 1A, during a flow rate transition between two stable flow rates, a new temperature distribution quickly occurs across the sensing elements 125, 130 of the sensor tube 120. However, a new, stable, temperature profile inside the thermal mass flow sensor 123 does not appear immediately after a flow rate change: it takes some time for heat flow inside components (e.g., an insulator) of the thermal mass flow sensor 123 to change temperature and build a new, stable, temperature profile. A typical time constant of heat-transfer-processes (that occur while the temperature profile is becoming stable) is around four to six seconds in some instances, two to ten seconds in other instances, and in some other instances, longer. As a result, sensor nonlinearity may change relatively slowly, over time, during such a flow rate transition. Other sources of nonlinearity may change more slowly or more rapidly than the sensor nonlinearity and may have other dynamic properties. FIGS. 8A and 8B demonstrate the effect a time-dependent, dynamic source of nonlinearity may have on a nonlinearity component function accuracy.

FIG. 8A illustrates a graph depicting an exemplary sensor nonlinearity component function of an exemplary total nonlinearity correction function that may be used in steady-state conditions that do not significantly deviate from calibration conditions. If, for example, a flow rate through the MFC 100 changes from 100% steady-state flow at point 801a to 40% steady-state flow at point 804a and operating conditions do not change from calibration conditions, then the 40% flow rate may be inputted into the sensor nonlinearity correction function of the total nonlinearity characteristic function to determine a new value, 0.95, of the sensor nonlinearity correction function to be used in correcting the flow signal 161 without need for adjustment of the sensor nonlinearity correction function. Such calculations of nonlinearity correction function values may occur, for example, in the flow signal correction module 172. However, during the flow rate transition from 100% to 40% operating conditions may temporarily deviate from calibration conditions due to dynamic, time-dependent variations in sources of nonlinearity, such as sensor nonlinearity as described above. Specifically, the sensor nonlinearity may change gradually during the flow rate transition before stabilizing to steady-state conditions, potentially causing the sensor nonlinearity correction function to be temporarily inaccurate if not adjusted. Moreover, a similar problem exists after a change from a relatively low flow rate (e.g., 30%) to another relatively high flow rate (e.g., 90%) wherein the sensor nonlinearity changes gradually during the flow rate transition. Dynamic, time-dependent adjustments may be made to the sensor nonlinearity correction function responsive to the dynamic, time-dependent variations in sensor nonlinearity, as shown in FIG. 8B.

FIG. 8B illustrates a graph depicting an exemplary sensor nonlinearity component function of an exemplary total nonlinearity correction function that is dynamically adjusted. If, for example, a flow rate through the MFC 100 changes from 100% steady-state flow at point 801b to 40% steady-state flow at point 804b and sensor nonlinearity changes gradually during the flow rate transition before stabilizing to steady-state conditions, then the sensor nonlinearity component function may be adjusted dynamically, over time, responsive to the time-dependent changes in sensor nonlinearity so that the sensor nonlinearity component function effectively becomes a time-dependent sensor nonlinearity component function. Specifically, the sensor nonlinearity component function may be adjusted so that the value of the sensor nonlinearity component function changes gradually from 0.65, point 802b, at a first time to 0.80, point 803b, at a second time to 0.95, point 804b, at a third time during the flow rate transition between 100% flow to 40% flow to compensate for a corresponding gradual change in sensor nonlinearity.

The dynamic, time-dependent adjustment of the sensor nonlinearity component function responsive to time-dependent changes in sensor nonlinearity demonstrated in FIG. 8B may be more generally applied to other nonlinearity component functions and their corresponding sources of nonlinearity. For example, dynamic, time-dependent adjustment of a nonlinearity component function during a flow rate transition may be proportional to a difference between the value of the nonlinearity component function at an initial flow rate and the value of the nonlinearity component function at a final flow rate and may include a time-based element.

In a specific example, a nonlinearity component function may be adjusted dynamically, over time, so that the nonlinearity component function becomes a dynamic, time-dependent nonlinearity component function that may be described as: $C_D(f,t) = C(f2) + [C(f1) - C(f2)] * \exp(-t/T)$ (Equation 13), where f1 is an initial flow rate of the gas, f2 is a final flow rate of the gas, C is a nonlinearity component function, t is time, T is a time constant, $C_D$ is a dynamic, time-dependent nonlinearity component function, and f is a flow rate. The nonlinearity component function may be the nonlinearity component function that is dynamically adjusted to become the time-dependent nonlinearity component function. The time constant, T, may be based on dynamic properties of a source of nonlinearity corresponding to the nonlinearity component function and may vary depending on the initial and final flow rates, f1 and f2. The time, t, may start when a time-dependent change in the source of nonlinearity occurs, such as at the start of a flow rate transitionary period. The time-based element, $\exp(-t/T)$, is an exponential decay time-based element in this case; however, the time-based element may be, for example, any time-based mathematical function that may be used to model the dynamic adjustment applied to a nonlinearity component function that compensates for dynamic changes in a corresponding source of nonlinearity. Equation 13 may, for example, be used in the adjusting of Block 1008 of method 1000 to calculate dynamic, time-dependent nonlinearity component functions in the dynamic nonlinearity adjustment module 173.

In other embodiments, the dynamic, time-dependent changes in a source of nonlinearity may be measured under certain conditions, such as a flow rate transition between two specific flow rates, and stored in the nonlinearity characterization data 166. Such measured dynamic, time-dependent properties of a source of nonlinearity may be used, rather than a mathematical characterization or approximation, to determine dynamic adjustments to make to a nonlinearity component function under the same certain conditions.

Figure 9:
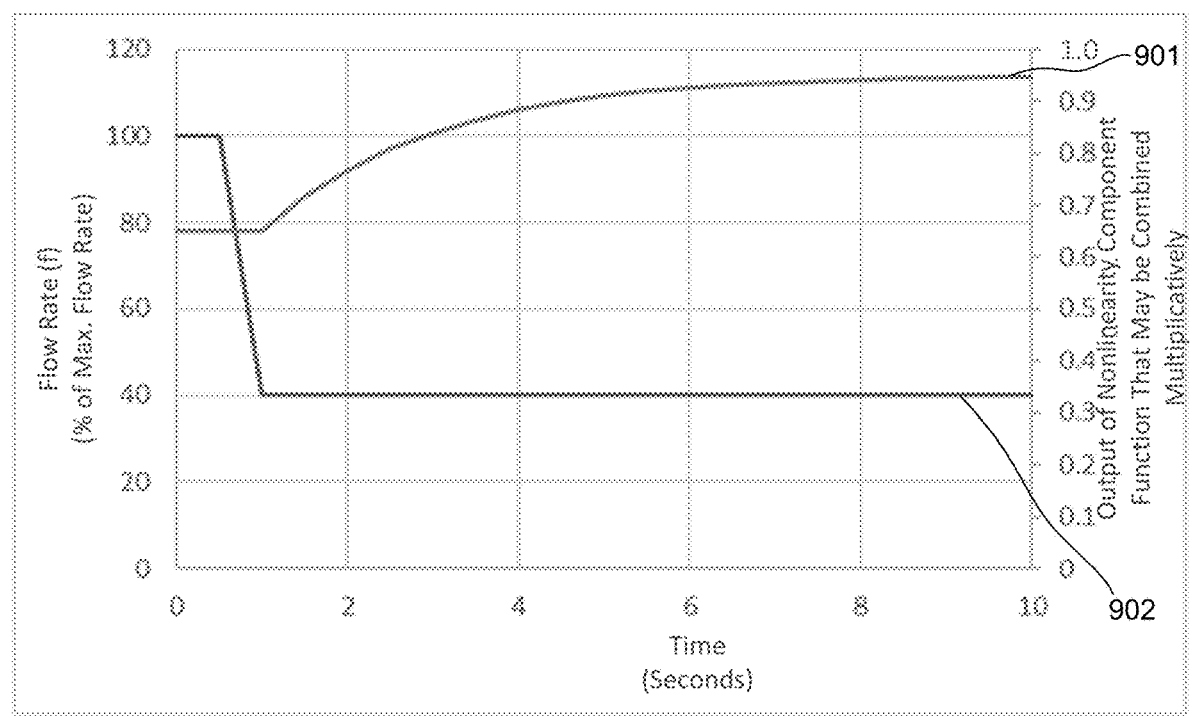
FIG. 9 depicts graphs of an exemplary dynamic sensor nonlinearity component function of an exemplary total nonlinearity correction function and an exemplary flow rate transition.

FIG. 9 illustrates graphs of an exemplary dynamic sensor nonlinearity component function 901 of an exemplary total nonlinearity correction function and an exemplary flow rate transition. As shown, the flow rate, line 902, through the MFC 100 changes from 100% steady-state flow to 40% steady-state flow and the dynamic sensor nonlinearity component function 901 changes gradually, from 0.65 to 0.95, during the flow rate transitionary period, such as due to dynamic adjustments, before stabilizing to steady-state conditions. The dynamic sensor nonlinearity component function 901 may be calculated using Equation 13.

In some embodiments, a total nonlinearity characteristic function may comprise a plurality of dynamic, time-dependent nonlinearity component functions, such as dynamically adjusted nonlinearity component functions, that are combined through multiplication. For example, the total nonlinearity characteristic function may be described as: $F(f,t) = F_0(f) * C_1(f,t) * C_2(f,t) * \ldots * C_N(f,t)$ (Equation 14) where f is a flow rate, t is time, F is the total nonlinearity characteristic function, $C_1 \ldots C_N$ are dynamic, time-dependent nonlinearity component functions, $F_0$ is a fundamental component function, and N is the number of nonlinearity component functions. Equation 14 may, for example, be used in the updating of Block 1010 of method 1000 to calculate the total nonlinearity characteristic function in the nonlinearity compensator 165, such as in the flow signal correction module 172 of the nonlinearity compensator 165, after a nonlinearity component function is adjusted.

In some embodiments, the total nonlinearity characteristic function may, for example, be determined to comprise a first dynamic, time-dependent nonlinearity component function multiplied by a second dynamic, time-dependent nonlinearity component function. Specifically, the total nonlinearity characteristic function may be described as: $F(f,t)=K*f*C_1(f,t)*C_2(f,t)$ (Equation 15), where K is a constant, f is a current flow rate of the gas, t is time, $C_1(f,t)$ is a first dynamic, time-dependent nonlinearity component function, and $C_2(f)$ is a second dynamic, time-dependent nonlinearity component function. Equation 15 may, for example, be used in the updating of Block 1010 of method 1000 to calculate the total nonlinearity characteristic function in the nonlinearity compensator 165, such as in the flow signal correction module 172 of the nonlinearity compensator 165, after a nonlinearity component function is adjusted.

For example, Block 1008 of method 1000 may include adjusting dynamically over time, the first nonlinearity component function responsive to time-dependent changes in the first source of nonlinearity so that the first nonlinearity component function is a first time-dependent nonlinearity component function and adjusting dynamically over time, the second nonlinearity component function responsive to time-dependent changes in the second source of nonlinearity so that the second nonlinearity component function is a second time-dependent nonlinearity component function. The adjustments made to each of the nonlinearity component functions may be separate, potentially different adjustments made independently to each nonlinearity component function. The adjusting of block 1008 of method 1000 may also include calculating each of the first and second time-dependent nonlinearity component functions using Equation 13. Such calculations of time-dependent nonlinearity component functions may be executed by the nonlinearity compensator 165, such as in the dynamic nonlinearity adjustment module 173 of the nonlinearity compensator 165. The updating of block 1010 of method 1000 may include updating the total nonlinearity characteristic function after adjusting the second nonlinearity component and calculating the total nonlinearity characteristic function using Equation 15. Thus, the total nonlinearity characteristic function is updated, after the adjusting of the first and second nonlinearity component functions, to comprise the first and second time-dependent nonlinearity component functions. The calculating of a total nonlinearity characteristic function, such as by using Equation 15, may be executed by the nonlinearity compensator 165, such as in the dynamic nonlinearity adjustment module 173 of the nonlinearity compensator 165.

The ability, provided by the present disclosure, to independently adjust individual nonlinearity component functions responsive to changes in corresponding sources of nonlinearity, which may each vary independently, may enable a more accurate, robust total nonlinearity characteristic function of a thermal mass flow sensor that can compensate for deviations in operating conditions from calibration condition. For example, the present disclosure may enable a sensor nonlinearity component function of a total nonlinearity characteristic function to be dynamically adjusted, over time, responsive to a flow rate transition, such as using Equation 13, while a bypass nonlinearity component function of the nonlinearity component function may be adjusted, potentially simultaneously, using a steady-state adjustment. Such differential adjustment of different nonlinearity component functions may be used to overcome the deficiencies of the prior art, such as the inaccurate dynamic correction of a flow signal caused by increasing bypass nonlinearity at high flow rates. As a result, the present disclosure may enable a more accurate total nonlinearity characteristic function, which may be used to more accurately control gas flow through a MFC.

Figure 11:
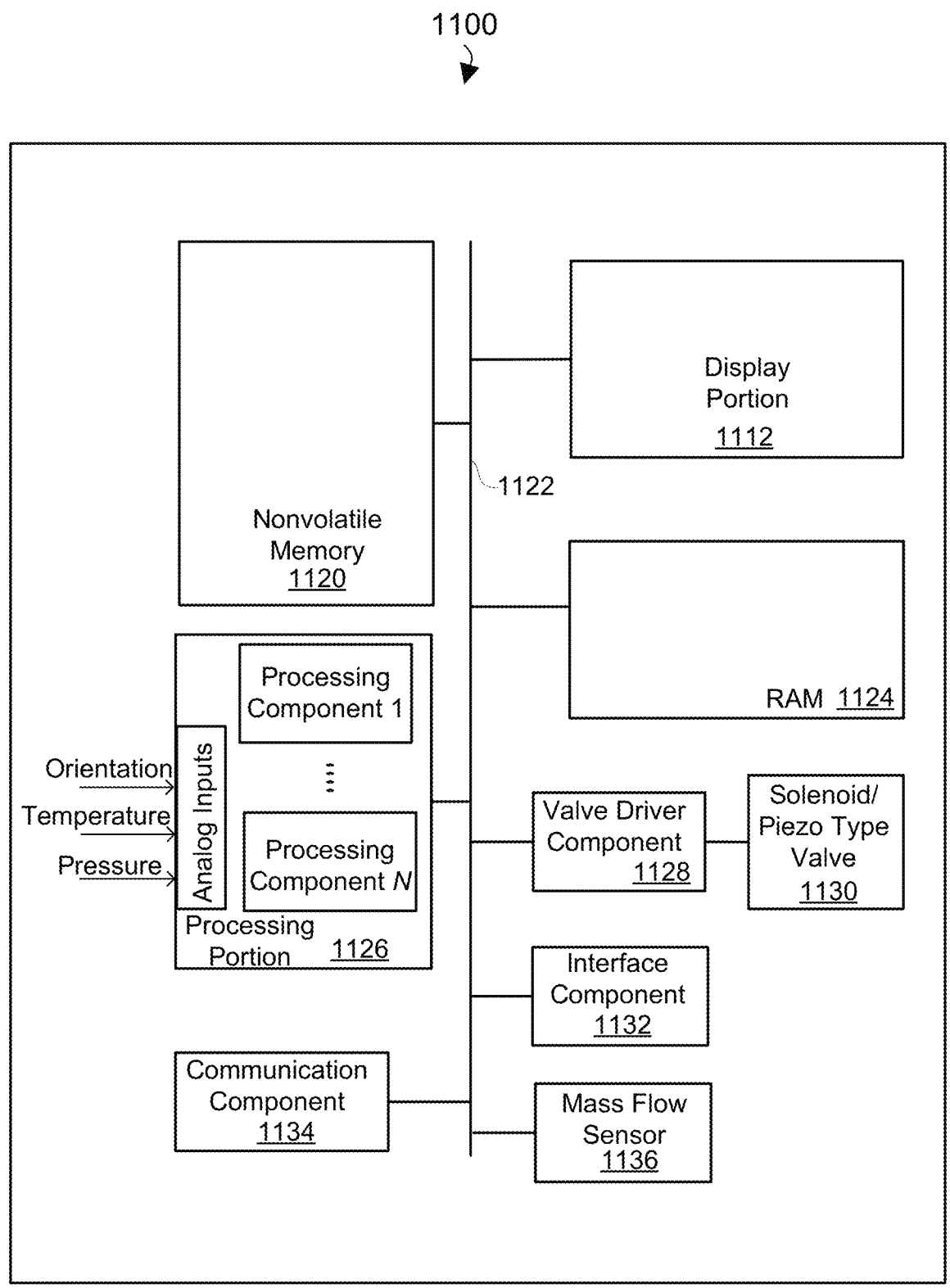
FIG. 11 is a block diagram depicting physical components of the MFC that may be used to realize aspects of the MFC depicted in FIG. 1A and the nonlinearity compensator depicted in FIG. 1B.

Referring next to FIG. 11, shown is a block diagram 1100 depicting physical components that may be utilized to realize the MFC 100 described with reference to FIG. 1A. The physical components along with the MFC 100 may provide a means for executing method 1000 and the other disclosed exemplary methods that may be traversed in connection with embodiments disclosed herein. As shown, a display 1112, and nonvolatile memory 1120 are coupled to a bus 1122 that is also coupled to random access memory ("RAM") 1124, a processing portion (which includes N processing components) 1126, a valve driver component 1128 that is in communication with a solenoid or piezo type valve 1130, an interface component 1132, a communication component 1134, and a mass flow sensor 1136. Although the components depicted in FIG. 11 represent physical components, FIG. 11 is not intended to be a hardware diagram; thus, many of the components depicted in FIG. 11 may be realized by common constructs or distributed among additional physical components. Moreover, it is certainly contemplated that other existing and yet-to-be developed physical components and architectures may be utilized to implement the functional components described with reference to FIG. 11.

The display 1112 generally operates to provide a presentation of content to a user, and in several implementations, the display is realized by an LCD or OLED display. For example, the display 1112 may provide an indicated flow as a graphical or numeric representation of the corrected flow signal 167. In general, the nonvolatile memory 1120 functions to store (e.g., persistently store) data and executable code including code that is associated with the functional components depicted in FIGS. 1A and 1B. In some embodiments for example, the nonvolatile memory 1120 includes bootloader code, software, operating system code, file system code, and code to facilitate the implementation of one or more portions of the components discussed in connection with FIGS. 1A and 1B. In alternative implementations dedicated hardware may be utilized to implement one or more components depicted in FIGS. 1A and 1B. For example, a digital signal processor may be utilized to realize the nonlinearity compensator 165 depicted in FIGS. 1A and 1B.

In many implementations, the nonvolatile memory 1120 is realized by flash memory (e.g., NAND or ONENAND memory), but it is certainly contemplated that other memory types may be utilized. Although it may be possible to execute the code from the nonvolatile memory 1120, the executable code in the nonvolatile memory 1120 is typically loaded into RAM 1124 and executed by one or more of the N processing components in the processing portion 1126. As shown, the processing portion 1126 may receive analog temperature and pressure inputs that are utilized by the functions carried out by the control component 170.

The N processing components in connection with RAM 1124 generally operate to execute the instructions stored in nonvolatile memory 1120 to effectuate the functional components depicted in FIGS. 1A and 1B.

The interface component 1132 generally represents one or more components that enable a user to interact with the MFC 100. The interface component 1132, for example, may include a keypad, touch screen, and one or more analog or digital controls, and the interface component 1132 may be used to translate an input from a user into the setpoint signal 186. And the communication component 1134 generally enables the MFC 100 to communicate with external networks and devices including external processing tools. For example, an indicated flow may be communicated to external devices via the communication component 1134. One of ordinary skill in the art will appreciate that the communication component 1134 may include components (e.g., that are integrated or distributed) to enable a variety of wireless (e.g., WiFi) and wired (e.g., Ethernet) communications.

The mass flow sensor 1136 depicted in FIG. 11 depicts a collection of components known to those of ordinary skill in the art to realize the thermal mass flow sensor 123 shown in FIG. 1A. These components may include sensing elements, amplifiers, analog-to-digital conversion components, and filters.

Those of skill in the art will appreciate that the information and signals discussed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. In addition, the various illustrative logical blocks, modules, circuits, and algorithm steps described in connection with the embodiments disclosed herein may be implemented by other alternative components than those depicted in FIG. 11.

Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling a mass flow controller, the method comprising:
   providing a gas through a thermal mass flow sensor of the mass flow controller;
   processing a sensor signal from the thermal mass flow sensor of the mass flow controller to produce a flow signal;
   determining a total nonlinearity characteristic function based on nonlinearity effects on the flow signal, wherein the total nonlinearity characteristic function includes, at least, a sensor nonlinearity component function, based on a sensor nonlinearity, and a bypass nonlinearity component function, based on a bypass nonlinearity;
   calibrating the total nonlinearity characteristic function;
   adjusting the sensor nonlinearity component function responsive to changes in the sensor nonlinearity;
   updating the total nonlinearity characteristic function after adjusting the sensor nonlinearity component function;
   correcting the flow signal to produce a corrected flow signal using the total nonlinearity characteristic function; and
   controlling a valve of the mass flow controller using the corrected flow signal and a setpoint signal.

2. The method of claim 1, comprising adjusting the bypass nonlinearity component function, independently of the sensor nonlinearity component function, responsive to changes in the bypass nonlinearity, and the updating the total nonlinearity characteristic function includes updating the total nonlinearity characteristic function after adjusting the bypass nonlinearity component function.

3. The method of claim 1, wherein the adjusting the total nonlinearity characteristic function includes adjusting, dynamically over time, the sensor nonlinearity component function responsive to time-dependent changes in the sensor nonlinearity so that the sensor nonlinearity component function is a sensor time-dependent nonlinearity component function.

4. The method of claim 3, wherein:
   the determining the total nonlinearity characteristic function includes:
      determining the sensor nonlinearity component function;
      determining the bypass nonlinearity component function; and
   the adjusting includes adjusting, dynamically over time, the sensor nonlinearity component function responsive to a flow rate transition of the gas.

5. The method of claim 1, wherein the determining the total nonlinearity characteristic function includes determining the total nonlinearity characteristic function, $F(f)=K*f*C_1(f)*C_2(f)$, where K is a constant, f is a current flow rate of the gas, $C_1(f)$ is the sensor nonlinearity component function, and $C_2(f)$ is the bypass nonlinearity component function.

6. The method of claim 3, wherein:
   the adjusting includes:
      adjusting, dynamically over time, the bypass nonlinearity component function responsive to time-dependent changes in the bypass nonlinearity so that the bypass nonlinearity component function is a bypass time-dependent nonlinearity component function;
      calculating each time-dependent nonlinearity component function, $C_D(f,t)=C(f2)+[C(f1)-C(f2)]*\exp(-t/T)$, where f1 is an initial flow rate of the gas, f2 is a final flow rate of the gas, C is a nonlinearity component function, t is time, and T is a time constant; and
   the updating the total nonlinearity characteristic function includes:
      updating the total nonlinearity characteristic function after adjusting the bypass nonlinearity component function; and
      calculating the total nonlinearity characteristic function, $F(f,t)=K*f*C_1(f,t)*C_2(f,t)$, where f is a flow rate, t is time, K is a constant, $C_1(f,t)$ is the sensor time-dependent nonlinearity component function, and $C_2(f,t)$ is the bypass time-dependent nonlinearity component function.

7. A mass flow controller comprising:
   a main flow path for a gas;
   a control valve to control a flow rate of the gas through the main flow path;
   a thermal mass flow sensor coupled to the main flow path to provide a sensor signal indicative of a mass flow rate of the gas;
   means for processing the sensor signal from the thermal mass flow sensor of the mass flow controller to produce a flow signal;

means for determining a total nonlinearity characteristic function based on nonlinearity effects on the flow signal, wherein the total nonlinearity characteristic function includes, at least, a sensor nonlinearity component function, based on a sensor nonlinearity, and a bypass nonlinearity component function, based on a bypass nonlinearity;

means for calibrating the total nonlinearity characteristic function;

means for adjusting the sensor nonlinearity component function responsive to changes in the sensor nonlinearity;

means for updating the total nonlinearity characteristic function after adjusting the sensor nonlinearity component function;

means for correcting the flow signal to produce a corrected flow signal using the total nonlinearity characteristic function; and a control component coupled to the means for correcting and the control valve to control a position of the control valve based upon the corrected flow signal and a setpoint signal.

8. The mass flow controller of claim 7, wherein the means for adjusting includes means for adjusting the bypass nonlinearity component function, independently of the sensor nonlinearity component function, responsive to changes in the bypass nonlinearity, and the means for updating includes means for updating the total nonlinearity characteristic function after adjusting the bypass nonlinearity component.

9. The mass flow controller of claim 7, wherein the means for adjusting includes means for adjusting, dynamically over time, the sensor nonlinearity component function responsive to time-dependent changes in the sensor nonlinearity so that the sensor nonlinearity component function is a sensor time-dependent nonlinearity component function.

10. The mass flow controller of claim 9, wherein:
the means for determining includes:
means for determining the sensor nonlinearity component function;
means for determining the bypass nonlinearity component function; and
the means for adjusting includes means for adjusting, dynamically over time, the sensor nonlinearity component function responsive to a flow rate transition of the gas.

11. The mass flow controller of claim 7, wherein the means for determining includes means for determining the total nonlinearity characteristic function, $F(f)=K*f*C_1(f)*C_2(f)$, where K is a constant, f is a current flow rate of the gas, $C_1(f)$ is the sensor nonlinearity component function, and $C_2(f)$ is the bypass nonlinearity component function.

12. The mass flow controller of claim 9, wherein:
the means for adjusting includes:
means for adjusting, dynamically over time, the bypass nonlinearity component function responsive to time-dependent changes in the bypass nonlinearity so that the bypass nonlinearity component function is a bypass time-dependent nonlinearity component function;
means for calculating each time-dependent nonlinearity component function, $C_D(f,t)=C(f2)+[C(f1)-C(f2)]*\exp(-t/T)$, where f1 is an initial flow rate of the gas, f2 is a final flow rate of the gas, C is a nonlinearity component function, t is time, and T is a time constant; and the means for updating includes:
means for updating the total nonlinearity characteristic function after adjusting the bypass nonlinearity component function; and
means for calculating the total nonlinearity characteristic function, $F(f,t)=K*f*C_1(f,t)*C_2(f,t)$, where f is a flow rate, t is time, K is a constant, $C_1(f,t)$ is the sensor time-dependent nonlinearity component function, and $C_2(f,t)$ is the bypass time-dependent nonlinearity component function.

13. A mass flow controller comprising:
a main flow path for a gas;
a control valve to control a flow rate of the gas though the main flow path;
a thermal mass flow sensor coupled to the main flow path to provide a sensor signal indicative of a mass flow rate of the gas;
a processing portion to receive and process the sensor signal from the thermal mass flow sensor to produce a flow signal; and
a nonlinear compensator including a non-transitory, tangible processor readable storage medium, encoded with processor executable instructions to produce a corrected flow signal, the processor executable instructions comprising instructions to:
determine a total nonlinearity characteristic function based on nonlinearity effects on the flow signal, wherein the total nonlinearity characteristic function includes, at least, a sensor nonlinearity component function, based on a sensor nonlinearity, and a bypass nonlinearity component function, based on a bypass nonlinearity;
calibrate the total nonlinearity characteristic function;
adjust the sensor nonlinearity component function responsive to changes in the sensor nonlinearity;
update the total nonlinearity characteristic function after adjusting the sensor nonlinearity component function;
correct the flow signal to produce the corrected flow signal using the total nonlinearity characteristic function; and
a control component coupled to the nonlinear compensator and the control valve to control a position of the control valve based upon the corrected flow signal and a setpoint signal.

14. The mass flow controller of claim 13, wherein the instructions to adjust include instructions to adjust the bypass nonlinearity component function, independently of the sensor nonlinearity component function, responsive to changes in the bypass nonlinearity, and the instructions to update include instructions to update the total nonlinearity characteristic function after adjusting the bypass nonlinearity component.

15. The mass flow controller of claim 13, wherein the instructions to adjust include instructions to adjust, dynamically over time, the sensor nonlinearity component function responsive to time-dependent changes in the sensor nonlinearity so that the sensor nonlinearity component function is a sensor time-dependent nonlinearity component function.

16. The mass flow controller of claim 15, wherein:
the instructions to determine include instructions to:
determine the sensor nonlinearity component function;
determine the bypass nonlinearity component function; and
the instructions to adjust include instructions to adjust, dynamically over time, the sensor nonlinearity component function responsive to a flow rate transition of the gas.

17. The mass flow controller of claim 13, wherein the instructions to determine include instructions to determine the total nonlinearity characteristic function, $F(f)=K*f*C_1(f)*C_2(f)$, where K is a constant, f is a current flow rate of the gas, $C_1(f)$ is the sensor nonlinearity component function, and $C_2(f)$ is the bypass nonlinearity component function.

18. The mass flow controller of claim 15, wherein:
the instructions to adjust include instructions to:
   adjust, dynamically over time, the bypass nonlinearity component function responsive to time-dependent changes in the bypass nonlinearity so that the bypass nonlinearity component function is a bypass time-dependent nonlinearity component function;
   calculate each time-dependent nonlinearity component function, $C_D(f,t)=C(f2)+[C(f1)-C(f2)]*\exp(-t/T)$, where f1 is an initial flow rate of the gas, f2 is a final flow rate of the gas, C is a nonlinearity component function, t is time, and T is a time constant; and the instructions to update include instructions to:
   update the total nonlinearity characteristic function after adjusting the bypass nonlinearity component function; and
   calculate the total nonlinearity characteristic function, $F(f,t)=K*f*C_1(f,t)*C_2(f,t)$, where f is a flow rate, t is time, K is a constant, $C_1(f,t)$ is the sensor time-dependent nonlinearity component function, and $C_2(f,t)$ is the bypass time-dependent nonlinearity component function.

* * * * *